(12) United States Patent
Suzuki

(10) Patent No.: US 9,660,902 B2
(45) Date of Patent: May 23, 2017

(54) APPARATUS, METHOD AND COMPUTER-READABLE MEDIUM OF PROVIDING ACCEPTABLE TRANSMISSION UNIT

(71) Applicant: FUJITSU LIMITED, Kawasaki-shi, Kanagawa (JP)

(72) Inventor: Kazuhiro Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 32 days.

(21) Appl. No.: 14/301,548

(22) Filed: Jun. 11, 2014

(65) Prior Publication Data
US 2015/0023146 A1      Jan. 22, 2015

(30) Foreign Application Priority Data

Jul. 17, 2013   (JP) .................................. 2013-148179

(51) Int. Cl.
   *H04L 12/703*   (2013.01)
   *H04L 12/46*    (2006.01)

(52) U.S. Cl.
   CPC .......... *H04L 45/28* (2013.01); *H04L 12/4633* (2013.01)

(58) Field of Classification Search
   None
   See application file for complete search history.

(56) References Cited

U.S. PATENT DOCUMENTS

| | | | |
|---|---|---|---|
| 5,892,753 A * | 4/1999 | Badt et al. ..................... | 370/233 |
| 2007/0076618 A1 * | 4/2007 | Hirose .................... | H04L 47/10 370/249 |
| 2009/0185572 A1 | 7/2009 | Yasuma | |
| 2010/0306391 A1 * | 12/2010 | Mason et al. ................. | 709/228 |
| 2012/0324442 A1 * | 12/2012 | Barde ..................... | H04L 49/70 718/1 |
| 2014/0241144 A1 * | 8/2014 | Kashyap ....................... | 370/216 |
| 2014/0301395 A1 * | 10/2014 | Khanal ................. | H04L 45/021 370/392 |

FOREIGN PATENT DOCUMENTS

| | | |
|---|---|---|
| JP | 2004-535713 | 11/2004 |
| JP | 2009-171307 | 7/2009 |
| JP | 2011-186805 | 9/2011 |
| WO | 02/099591 A2 | 12/2002 |

OTHER PUBLICATIONS

Suzuki et al., "Design of a Realtime Network in Virtual Machine Environment with OpenFlow", Multimedia, Distributed, Cooperative, and Mobile Symposium (DICOMO 2013), Symposium Series vol. 2013, No. 2, Information Processing Society of Japan, Jul. 10, 2013, pp. 1859-1866**.
Japanese Office Action dated Feb. 21, 2017 in corresponding Japanese Patent Application No. 2013-148179.

* cited by examiner

*Primary Examiner* — Khaled Kassim
*Assistant Examiner* — Zhaohui Yang
(74) *Attorney, Agent, or Firm* — Staas & Halsey LLP

(57) ABSTRACT

An apparatus includes a memory; and a processor coupled to the memory and configured to: detect change of an acceptable transmission unit in a network segment, the change being detected due to a transmission of a first packet transmitted from a first virtual machine; identify a second virtual machine configured to communicate via the network segment; and cause the second virtual machine to transmit a second packet based on the change.

19 Claims, 39 Drawing Sheets

FIG. 8

| ID | GUEST MAC | DESTINATION MAC | TUNNEL METHOD | HEADER LENGTH | MTU |
|---|---|---|---|---|---|
| 1 | XX:XX:XX:XX:XX:XX | aa:aa:aa:aa:aa:aa | GRE | 42 | 1500 |
| 2 | YY:YY:YY:YY:YY:YY | bb:bb:bb:bb:bb:bb | None | 0 | 1500 |
| 3 | ZZ:ZZ:ZZ:ZZ:ZZ:ZZ | cc:cc:cc:cc:cc:cc | VXLAN | 42 | 1460 |

FIG. 13C

| ID | GUEST MAC | DESTINATION MAC | TUNNEL METHOD | HEADER LENGTH | MTU |
|---|---|---|---|---|---|
| 3 | MAC_3 | MAC_A1 | GRE | 42 | 1460 |

FIG. 16A

| ID | GUEST MAC | DESTINATION MAC | TUNNEL METHOD | HEADER LENGTH | MTU |
|---|---|---|---|---|---|
| 1 | MAC_1 | MAC_A1 | None | 0 | 1500 |
| 2 | MAC_2 | MAC_A1 | None | 0 | 1500 |

FIG. 16B

| ID | GUEST MAC | DESTINATION MAC | TUNNEL METHOD | HEADER LENGTH | MTU |
|---|---|---|---|---|---|
| 1 | MAC_1 | MAC_B1 | GRE | 42 | 1460 |
| 2 | MAC_2 | MAC_B1 | GRE | 42 | 1460 |

FIG. 19

| ID | GUEST MAC | DESTINATION MAC | TUNNEL METHOD | HEADER LENGTH | MTU |
|---|---|---|---|---|---|
| 1 | MAC_1 | MAC_A1 | None | 0 | 1500 |
| 2 | MAC_2 | MAC_A1 | None | 0 | 1500 |

FIG. 21

| ID | GUEST MAC | DESTINATION MAC | TUNNEL METHOD | HEADER LENGTH | MTU |
|---|---|---|---|---|---|
| 1 | MAC_1 | MAC_A1 | None | 0 | 1500 |

FIG. 24

| ID | GUEST MAC | DESTINATION MAC | TUNNEL METHOD | HEADER LENGTH | MTU |
|---|---|---|---|---|---|
| 1 | MAC_1 | MAC_B1 | GRE | 42 | 1460 |
| 2 | MAC_2 | MAC_B1 | GRE | 42 | 1460 |
| 3 | MAC_3 | MAC_B1 | GRE | 42 | 1460 |

FIG. 25

| ID | GUEST MAC | DESTINATION MAC | TUNNEL METHOD | HEADER LENGTH | MTU |
|---|---|---|---|---|---|
| 1 | MAC_1 | MAC_B1 | GRE | 42 | 1460 |
| 2 | MAC_2 | MAC_B1 | GRE | 42 | 1460 |

FIG. 27

| ID | GUEST MAC | DESTINATION MAC | TUNNEL METHOD | HEADER LENGTH | MTU |
|---|---|---|---|---|---|
| 1 | MAC_1 | MAC_A11 | None | 0 | 1500 |
| 2 | MAC_2 | MAC_A11 | None | 0 | 1500 |
| 3 | MAC_3 | MAC_A11 | None | 0 | 1500 |

FIG. 29

| ID | GUEST MAC | DESTINATION MAC | TUNNEL METHOD | HEADER LENGTH | MTU |
|---|---|---|---|---|---|
| 1 | MAC_1 | MAC_B2 | GRE | 42 | 1460 |
| 2 | MAC_2 | MAC_B2 | GRE | 42 | 1460 |

FIG. 31

| ID | GUEST MAC | DESTINATION MAC | TUNNEL METHOD | HEADER LENGTH | MTU |
|---|---|---|---|---|---|
| 1 | MAC_2 | MAC_C1 | None | 0 | 1500 |

FIG. 32

| ID | GUEST MAC | DESTINATION MAC | TUNNEL METHOD | HEADER LENGTH | MTU |
|---|---|---|---|---|---|
| 1 | MAC_4 | MAC_A1 | GRE | 42 | 1460 |

FIG. 33

| ID | GUEST MAC | DESTINATION MAC | TUNNEL METHOD | HEADER LENGTH | MTU |
|---|---|---|---|---|---|
| 1 | MAC_3 | MAC_A1 | GRE | 42 | 1460 |
| 2 | MAC_4 | MAC_A1 | GRE | 42 | 1460 |

FIG. 34

| ID | GUEST MAC | DESTINATION MAC | TUNNEL METHOD | HEADER LENGTH | MTU |
|---|---|---|---|---|---|
| 1 | MAC_4 | MAC_B3 | None | 0 | 1500 |
| 2 | MAC_5 | MAC_B3 | None | 0 | 1500 |

FIG. 35

| ID | GUEST MAC | DESTINATION MAC | TUNNEL METHOD | HEADER LENGTH | MTU |
|---|---|---|---|---|---|
| 1 | MAC_3 | MAC_A1 | GRE | 42 | 1460 |
| 2 | MAC_4 | MAC_B3 | None | 0 | 1500 |
| 3 | MAC_5 | MAC_B3 | None | 0 | 1500 |

APPARATUS, METHOD AND COMPUTER-READABLE MEDIUM OF PROVIDING ACCEPTABLE TRANSMISSION UNIT

CROSS-REFERENCE TO RELATED APPLICATION

This application is based upon and claims the benefit of priority of the prior Japanese Patent Application No. 2013-148179, filed on Jul. 17, 2013, the entire contents of which are incorporated herein by reference.

FIELD

The embodiments discussed herein are related to an apparatus, a method and a computer-readable medium.

BACKGROUND

Path MTU Discovery is a protocol to find the minimum maximum transmission unit (MTU) of links on a network path and adjust the MTU automatically. An MTU is the maximum size of an IP datagram transmittable in one data transfer. In the Ethernet® local area network (LAN) environment, for example, the maximum size of an Ethernet frame is 1518 bytes and the MTU is given as 1500 bytes by excluding the Ethernet header (14 bytes) and frame check sequence (FCS, 4 bytes).

For example, a case in which, as depicted in FIG. 1, data is transmitted from a terminal A to a terminal B is considered. According to the protocol, when a packet with an MTU of 1500 is transmitted (step (1)), a router C discards the packet because the MTU between the router C and a router D is 1400, and returns an error to the terminal A, which has transmitted the packet, by using an internet control message protocol (ICMP) packet (step (2)). The process in step (2) is performed under the condition that the "don't fragment" (DF) flag is turned on (that is, fragmentation is forbidden) in the packet. In the error message by ICMP, a usable MTU (1400 in this case) is included. The terminal A transmits a packet again based on the MTU of 1400 (step (3)). If the DF flag is not set, fragmentation is conducted at the router C, causing the throughput to decrease.

In a data center or the like, many virtual machines (VMs) are launched on many physical machines. As depicted in FIG. 2, there is a case in which a virtual machine launched on a physical machine A (VMA) in a data center DC1 communicates with a virtual machine launched on a physical machine B (VMB) in another data center DC2, which is connected to the data center DC1 via a network such as a layer 3 (L3) network. In this case, communication is performed sometimes by constructing a virtual L2 network on the network such as an L3 network. This virtual L2 network is called an L2 tunnel, on which communication is performed by encapsulating an L2 packet with an L3 packet. When an L2 network is constructed, a tunnel endpoint of the L2 network is created on the host OS, which is a base operating system (OS) for a virtual machine environment on a physical machine.

When communication is performed in such an environment, the MTU of an L2 packet transmitted on the L2 network is to be determined in accordance with the MTU of an L3 packet transmitted on the L3 network. However, there is a case in which, when a change takes place in the L3 network configuration, not only the MTU of an L3 packet but also the MTU of an L2 packet changes. If a migration, launch, stop, or the like of a virtual machine takes place, there is a possibility that it causes construction or removal of an L2 tunnel and leads to a change in the MTU of L2 packets in use. No related art technology that may cope with such a problem has been developed. If a packet is generated with an inappropriate MTU, there is a possibility that fragmentation takes place on the communication path, causing a decrease in the throughput.

Japanese Laid-open Patent Publication No. 2011-186805 and Japanese National Publication of International Patent Application No. 2004-535713 are examples of the related art.

SUMMARY

According to an aspect of the invention, an apparatus includes a memory; and a processor coupled to the memory and configured to: detect change of an acceptable transmission unit in a network segment, the change being detected due to a transmission of a first packet transmitted from a first virtual machine; identify a second virtual machine configured to communicate via the network segment; and cause the second virtual machine to transmit a second packet based on the change.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating an example of a control table;

FIGS. 13A to 13C are diagrams illustrating examples of launching of virtual machines and an example of a control table on a physical machine on which the virtual machines are launched;

FIGS. 16A and 16B are diagrams illustrating an example of a control table prior to a change in a tunneling method;

FIG. 19 is a diagram illustrating an example of a control table with respect to FIG. 18;

FIG. 21 is a diagram illustrating an example of the control table with respect to FIG. 20;

FIG. 24 is a diagram illustrating an example of a control table with respect to FIG. 22;

FIG. 25 is a diagram illustrating an example of the control table with respect to FIG. 23;

FIG. 27 is a diagram illustrating an example of a control table with respect to FIG. 26;

FIG. 29 is a diagram illustrating an example of the control table with respect to FIG. 28;

FIG. 31 is a diagram illustrating an example of a control table with respect to FIG. 20;

FIG. 32 is a diagram illustrating an example of a control table with respect to FIG. 22;

FIG. 33 is a diagram illustrating an example of the control table related to FIG. 23;

FIG. 34 is a diagram illustrating an example of a control table with respect to FIG. 26;

FIG. 35 is a diagram illustrating an example of a control table with respect to FIG. 28;

DESCRIPTION OF EMBODIMENTS

Figure 1:
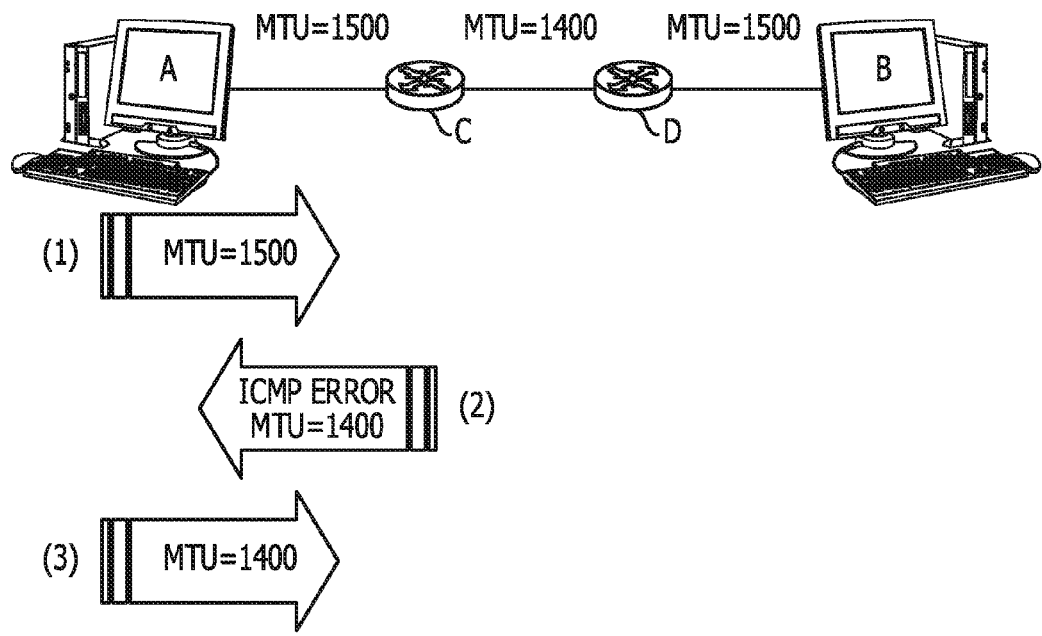
FIG. 1 is a diagram to describe ICMP.
Figure 2:
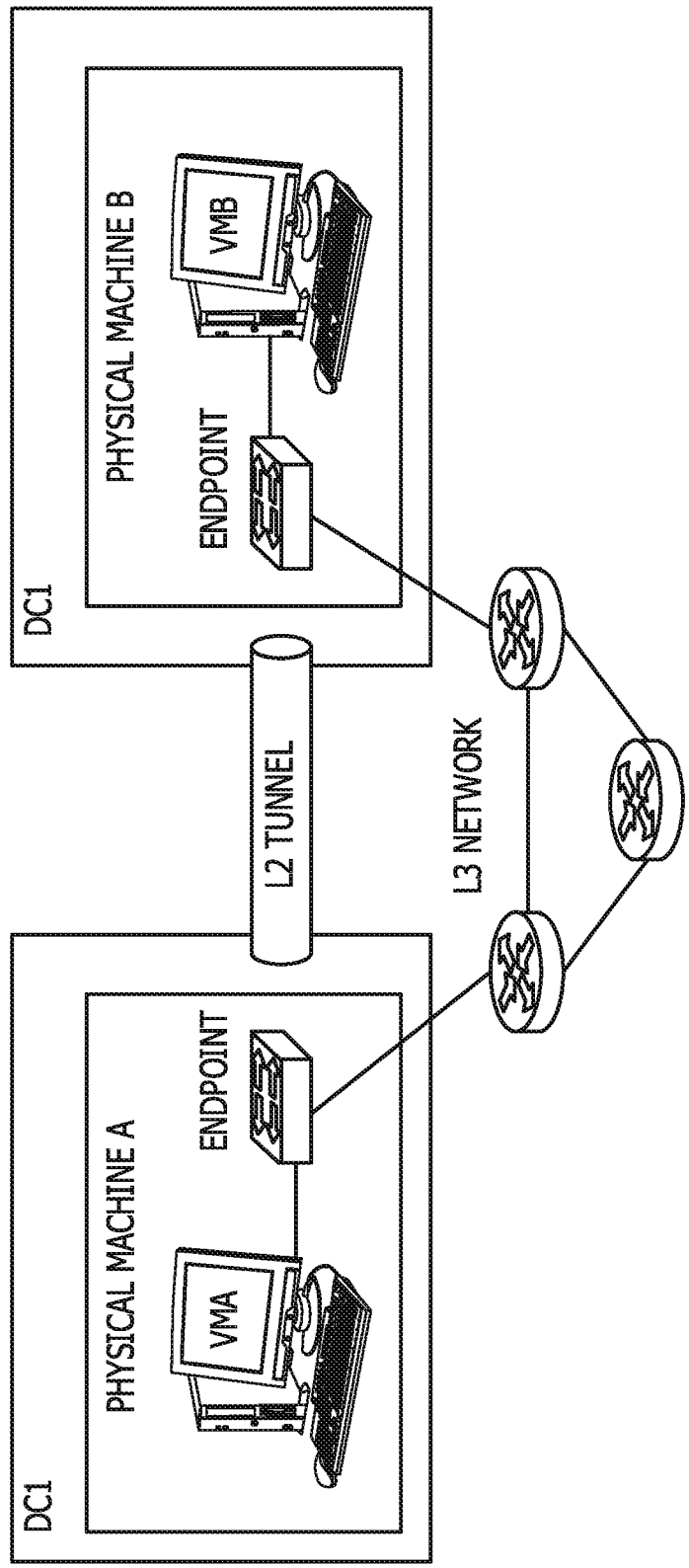
FIG. 2 is a diagram illustrating an example of a virtual environment.
Figure 3:
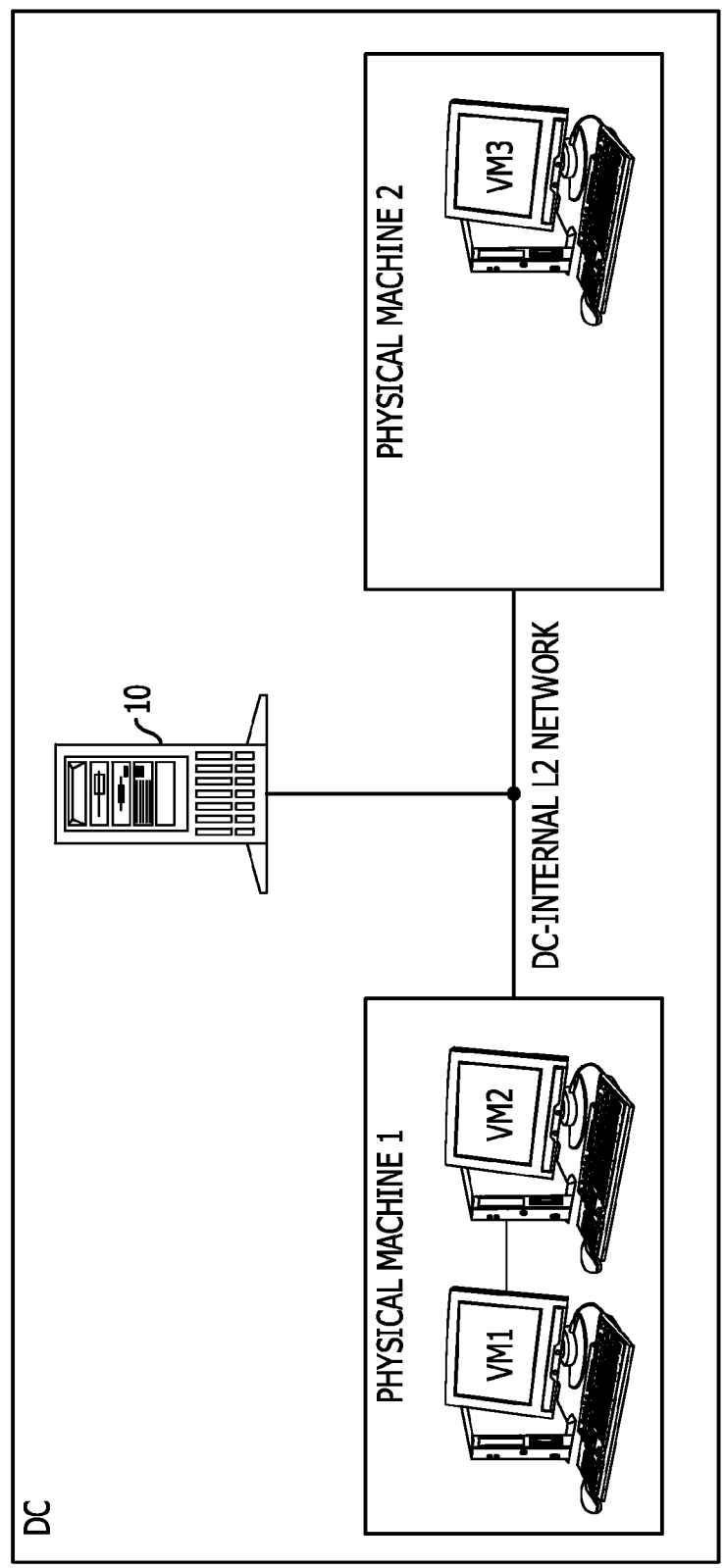
FIG. 3 is an overview diagram illustrating a system according to this embodiment.
Figure 4:
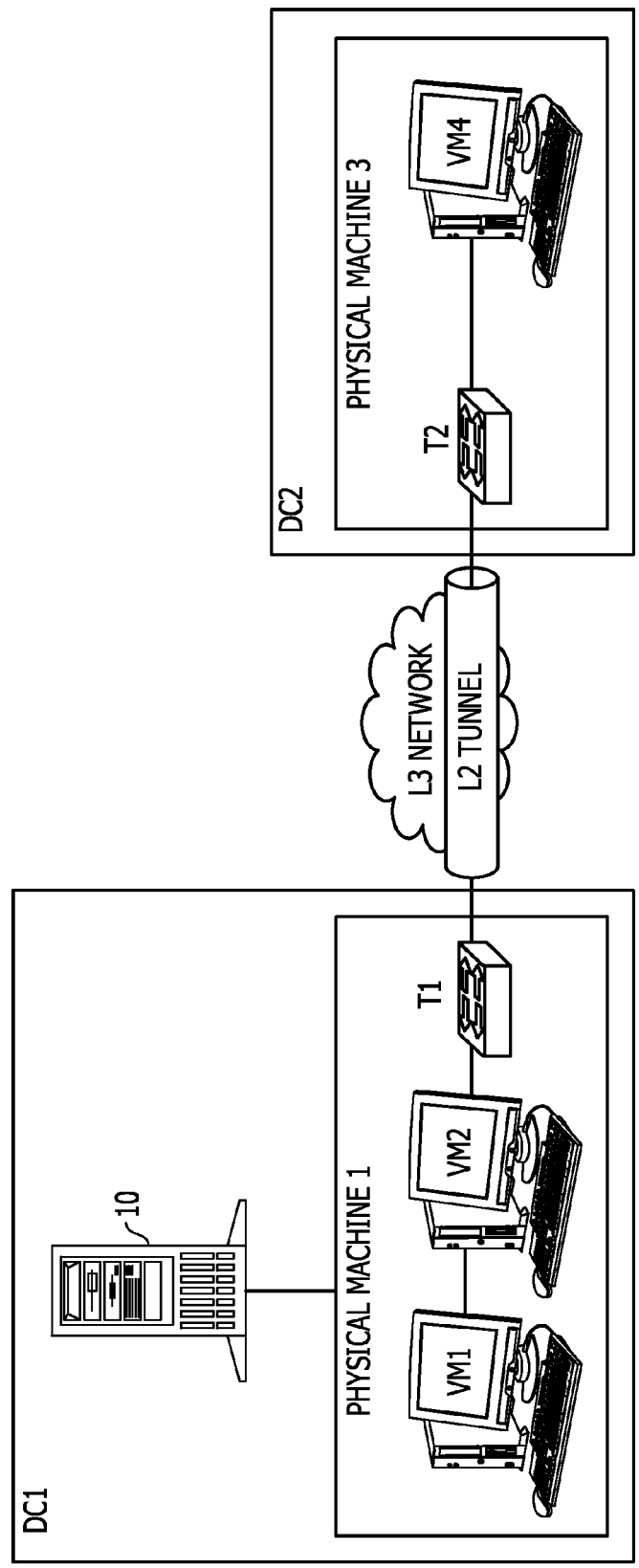
FIG. 4 is an overview diagram illustrating another system according to the embodiment.

FIG. 3 and FIG. 4 illustrate overviews of systems according to an embodiment.

In the example in FIG. 3, a plurality of physical machines are installed in a data center DC and are interconnected via a data center internal L2 network. In such a case, no L2 tunnel is usually constructed. On these physical machines, one or more virtual machines that belong to an identical network segment are launched. In the example in FIG. 3, virtual machines VM1 and VM2 are running on the physical machine 1 and a virtual machine VM3 is running on the physical machine 2. In the data center DC, an operation management apparatus 10, which manages launching, stopping, and the like of a virtual machine and construction, removal, and the like of a tunnel, is also installed.

Meanwhile, as depicted in FIG. 4, a data center DC1 is built at a remote location from a data center DC2. The data centers DC1 and DC2 are interconnected, for example, via an L3 network. In each data center, one or more physical machines are installed. In the example in FIG. 4, a physical machine 1 is installed in the data center DC1 and a physical machine 3 is installed in the data center DC2. On these physical machines, one or more virtual machines that belong to an identical network segment are running. In the example in FIG. 4, virtual machines VM1 and VM2 are running on the physical machine 1 and a virtual machine VM4 is running on the physical machine 3. In this case, to use an L2 tunnel, a tunnel endpoint T1 of the L2 tunnel is set up on the physical machine 1 and a tunnel endpoint T2 of the L2 tunnel is set up on the physical machine 3. At least in the data center DC1, an operation management apparatus 10, which manages launching, stopping, and the like of a virtual machine and construction, removal, and the like of a tunnel, is also installed.

Next, with reference to FIG. 5 and FIG. 6, a configuration of a physical machine according to the embodiment will be described below. In a physical machine, a hypervisor 100, a host OS, and one or more guest OSes are implemented. The hypervisor 100 is a program that makes it possible to run a plurality of guest OSes for virtual machines in parallel on a physical machine. The hypervisor 100 has a configuration management unit 110 and a configuration data storage unit 120. The configuration management unit 110 receives commands from the operation management apparatus 10 for launching, stopping, and migration of a virtual machine or construction, removal, and the like of an L2 tunnel and controls the host OS and guest OSes to perform launching, stopping, and migration of the virtual machine or construction, removal, and the like of the L2 tunnel by following the commands. The configuration data storage unit 120 stores, for example, for each network segment, data of the addresses (for example, media access control (MAC) address or, in some cases, IP address) of guest OSes which belong to the network segment and a communication method (tunneling type or the like) and endpoints used in the network segment.

The host OS has a host agent 200, a control table storage unit 210, and a data storage unit 220. The host agent 200 notifies a guest agent 300 in the guest OS of MTU data which have to be used by the guest OS side in response to the detection of a predetermined event and has a table update unit 201, an MTU detection unit 203, and a notification unit 202. The MTU detection unit 203 detects a change in the MTU by referring to a control table stored in the control table storage unit 210. The table update unit 201 updates the control table according to various situations. The notification unit 202 notifies the guest agent 300 in the guest OS of an MTU value to be used. The data storage unit 220, for example, stores header length data for each tunneling type.

The guest OS has a guest agent 300 and a setting data storage unit 310. The guest agent 300 has an MTU setting unit 301 which sets an MTU value received from the host OS for the setting data storage unit 310.

For the host OS and guest OS, responding to control by the hypervisor 100, a virtual network interface is provided and, on the host OS, a tunnel endpoint or the like for a bridge or L2 tunnel is also constructed. FIG. 5 illustrates an example in which Xen (produced by Citrix Systems, Inc.) is used as the hypervisor 100. In the example, a virtual network interface eth0 of the guest OS is connected to a tunnel endpoint T11 of an L2 tunnel via a virtual network interface Vif1.0 of the host OS. The tunnel endpoint T11 is connected to a physical interface via a virtual network interface eth0 of the host OS. In this example, however, the tunnel endpoint T11 is a software switch having bridge functions and functions as a tunnel endpoint. While the MTU notification in the embodiment may be performed by using these virtual network interfaces, communication may also be executed by using xenbus, a mechanism used for the control or the like of device drivers on Xen, without using such virtual network interfaces. For Hyper-V (produced by Microsoft), another hypervisor, VMBus, which has similar functions to the functions described above, is provided. The embodiment is applicable to other hypervisors and is not limited to Xen.

Figure 6:
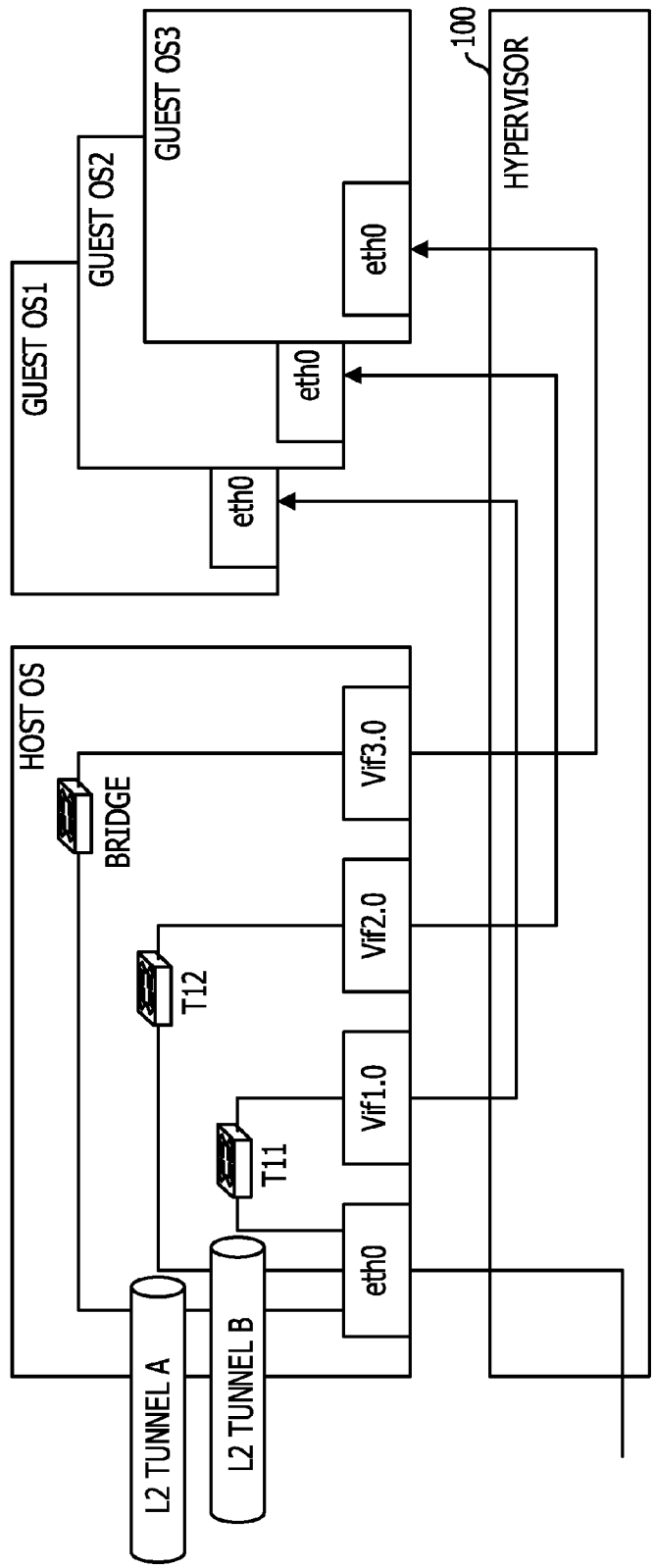
FIG. 6 is a diagram illustrating another configuration example of a physical machine according to the embodiment.
Figure 7:
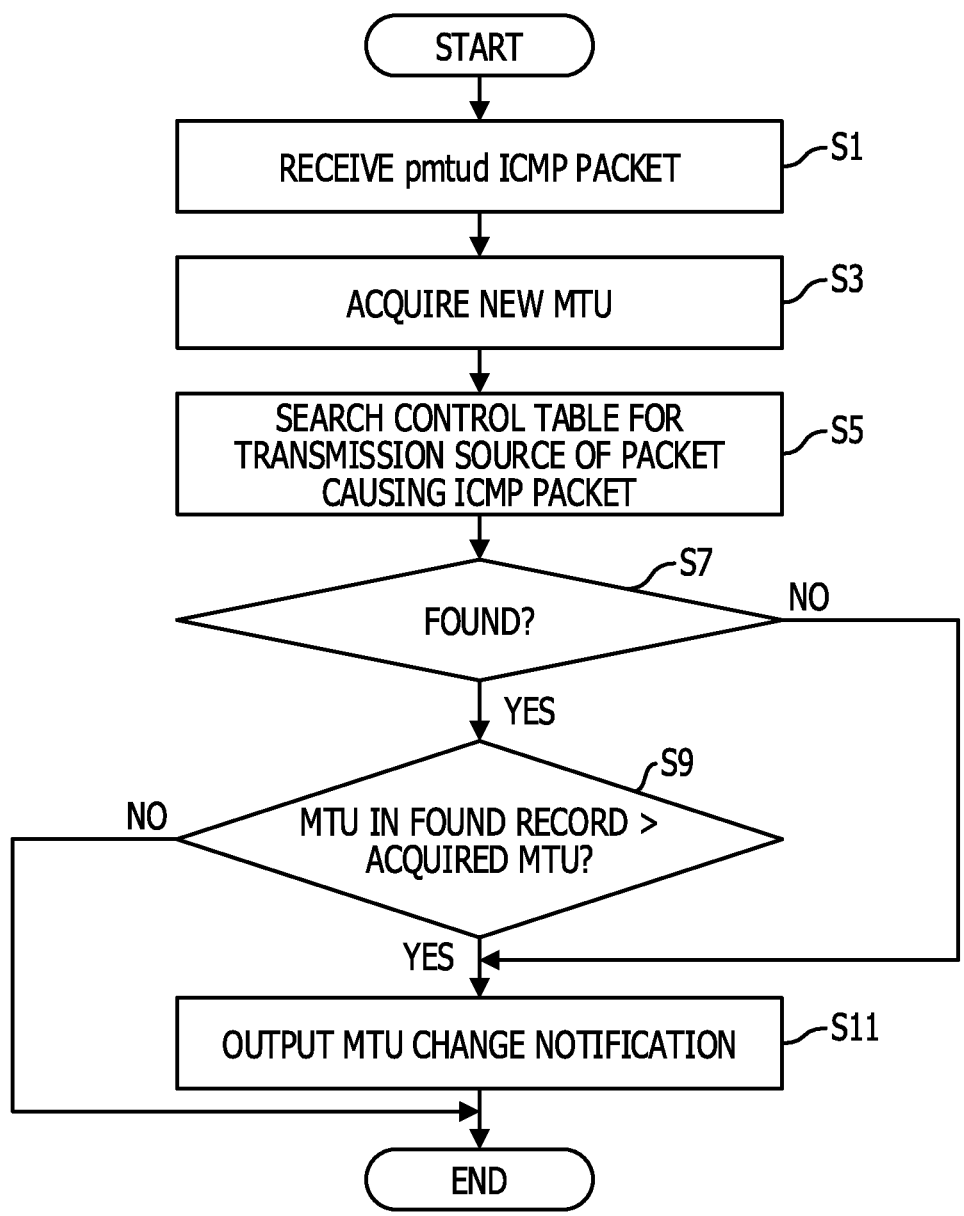
FIG. 7 is a flowchart illustrating a processing flow of an MTU detection unit.

For example, as depicted in FIG. 6, even an increase in the number of guest OSes or tunnels may be coped with by adding more tunnel endpoints or launching a virtual bridge on the host OS side. In the example in FIG. 6, a guest OS 1 is connected to a tunnel endpoint T11 via a virtual network interface Vif1.0 of the host OS and performs further communication through an L2 tunnel B. A guest OS 2 is connected to a tunnel endpoint T12 via a virtual network interface Vif2.0 of the host OS and performs further communication through an L2 tunnel A. A guest OS 3, which performs communication without using a tunnel, however, performs communication by being connected to a bridge of the host OS via a virtual network interface Vif3.0 of the host OS.

Figure 5:
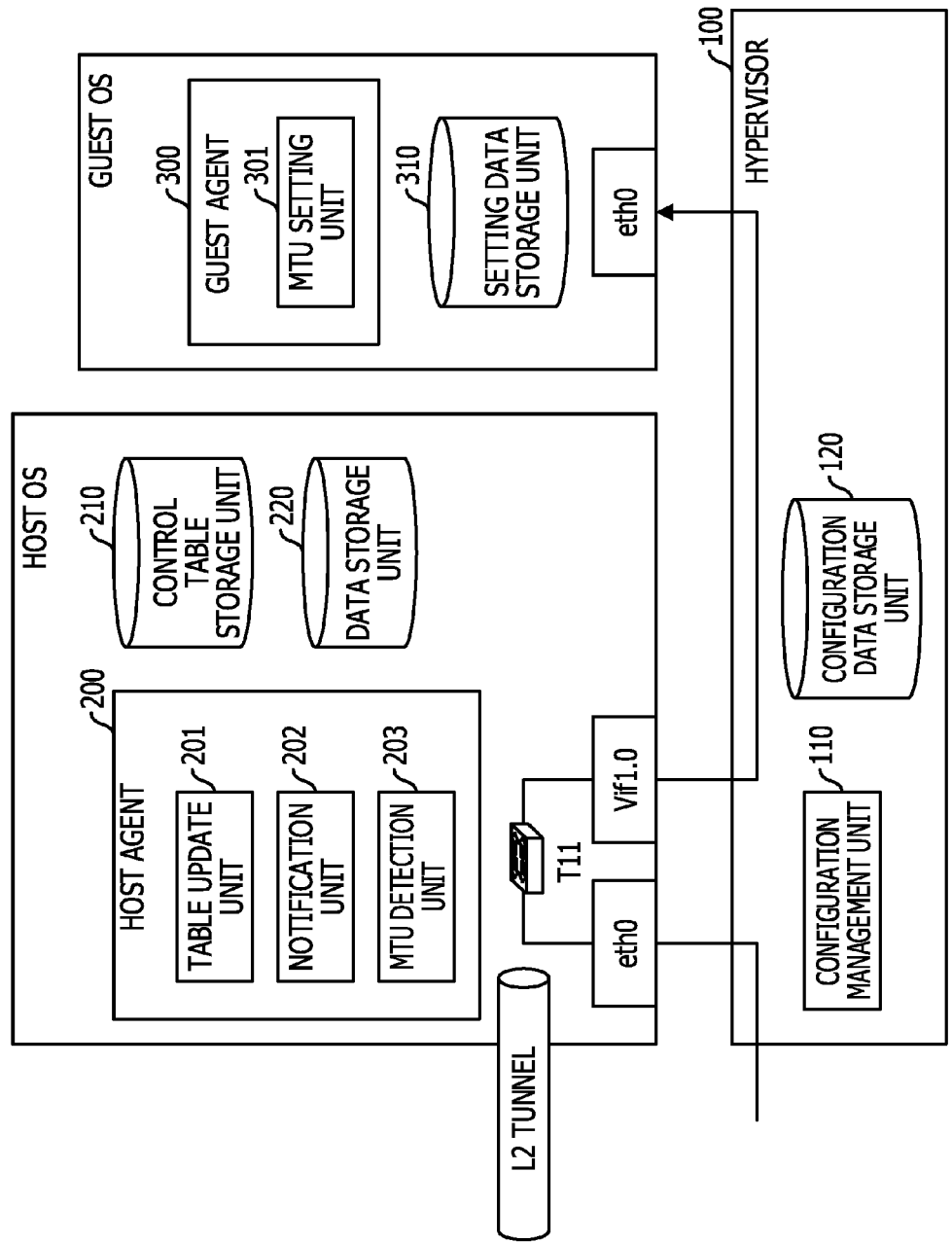
FIG. 5 is a diagram illustrating a configuration example of a physical machine according to the embodiment.

The construction and removal of the virtual network interfaces, virtual bridge, tunnel endpoints, and L2 tunnels depicted in FIG. 5 and FIG. 6 are examples of the related art and fundamental functions with which the host OS, guest OS, and hypervisor 100 have to be equipped. Therefore, no more in-depth description will be given.

Next, processing flows of the embodiment will be described with reference to FIGS. 7 to 35. For example, as described in BACKGROUND, when a normal packet, which is prohibited from fragmentation, is sent by a virtual machine, there is a case in which a router or the like somewhere on the network path returns a Path MTU Discovery (pmtud) ICMP packet.

When the MTU detection unit 203 receives such an ICMP packet (step S1 in FIG. 7), it acquires a new MTU value from the ICMP packet (step S3).

The MTU detection unit 203 searches the control table stored in the control table storage unit 210 for the MAC address of the transmission source of the packet that caused the transmission of the ICMP packet (step S5).

The control table is, for example, a table depicted in FIG. 8. In the example in FIG. 8, a record containing the ID (identification number) of the record, the MAC address of a guest OS (guest MAC), the MAC address of a destination endpoint (destination MAC), a tunneling method, a header length, and an MTU is registered in the table. In the example in FIG. 8, the first guest OS communicates with a destination endpoint through an L2 tunnel with a tunneling method of generic routing encapsulation (GRE). The header length of a packet sent by using this GRE tunneling method is 42. It is assumed that an MTU value of 1500 for this L2 tunnel is detected. Then, a value of 1458 (=1500−42) is the MTU for this guest OS. Because the second guest OS does not perform communication via an L2 tunnel, the MAC address of an endpoint (for example, a bridge) of the host OS is registered as a destination MAC address for the second guest OS. If communication via an L2 tunnel is not performed, the entry for the tunneling method is "None". In step S5, the column of the guest MAC address is searched for the MAC address of the transmission source.

Next, the MTU detection unit 203 determines whether or not a relevant record has been found in the control table (step S7). As will be described later, although the registration of a record for a virtual machine (that is, a guest OS) in the control table is usually performed when the virtual machine is launched, if the event in step S1 takes place before the registration, it is determined that the relevant record has not been found in step S7. If the record has not been found, the process moves to step S11 to register the guest OS with the MAC address of the transmission source in the control table and to change the MTU of the guest OS.

If the relevant record has been found, the MTU detection unit 203 determines whether or not the MTU in the found record is larger than the MTU acquired in step S3 (step S9). In a usual case, because packet transmission is performed based on the MTU in the found record, the MTU in the found record is larger than the acquired MTU when an ICMP packet is received. Because no condition other than the above may usually be assumed, the process ends if the MTU in the found record is less than or equal to the acquired MTU.

If the condition in step S9 is satisfied, on the other hand, the MTU detection unit 203 outputs an MTU change notification to the table update unit 201 (step S11). The MTU change notification includes data of the MAC address of the transmission source and MTU. Then, the process ends.

With this method, the control table may be updated and an event that has to be notified to a guest OS (that is, a virtual machine) may be detected appropriately.

Next, referring to FIGS. 9 to 35, processing flows by the table update unit 201 and the notification unit 202 will be described below.

Figure 9:
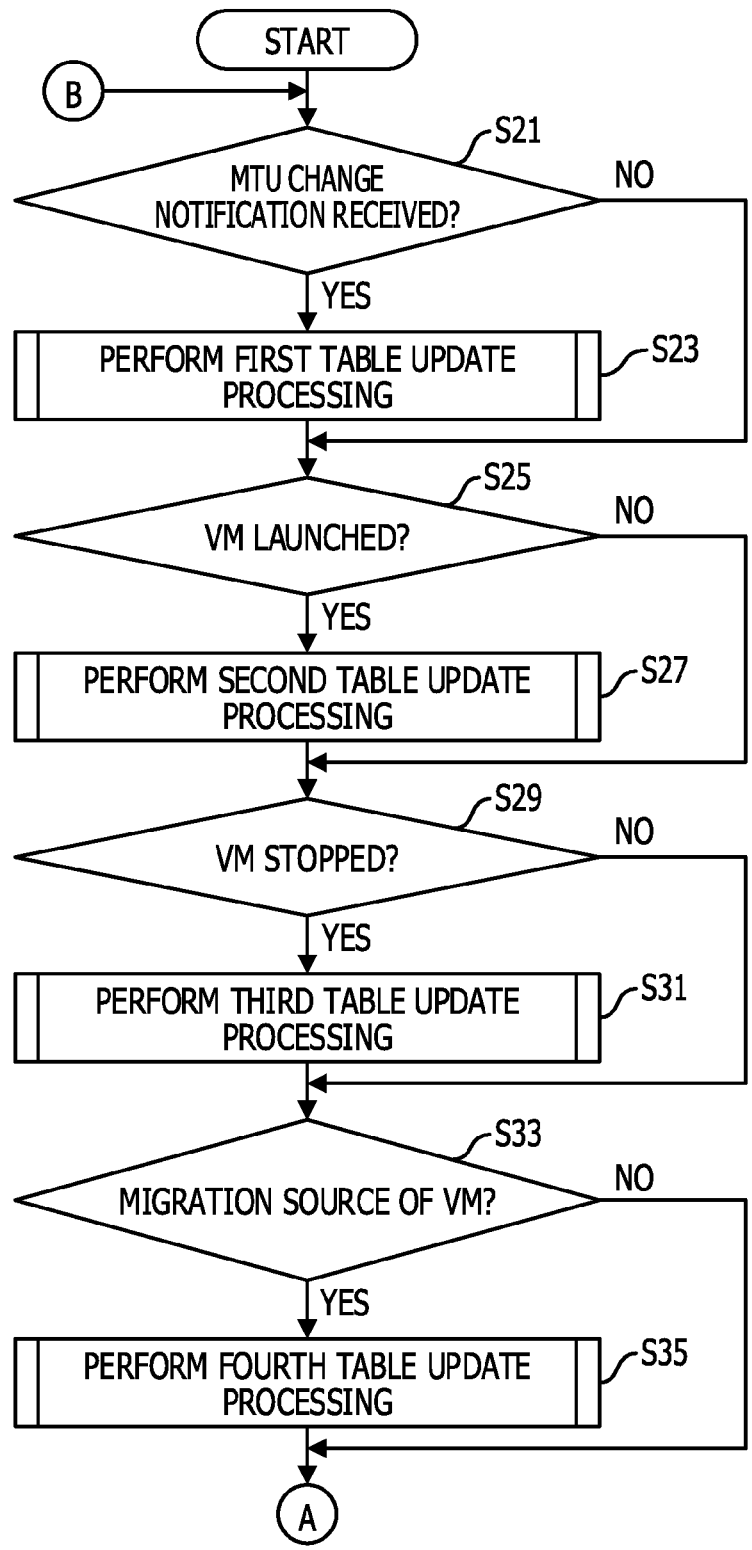
FIG. 9 is a flowchart illustrating a processing flow of a table update unit.
Figure 10:
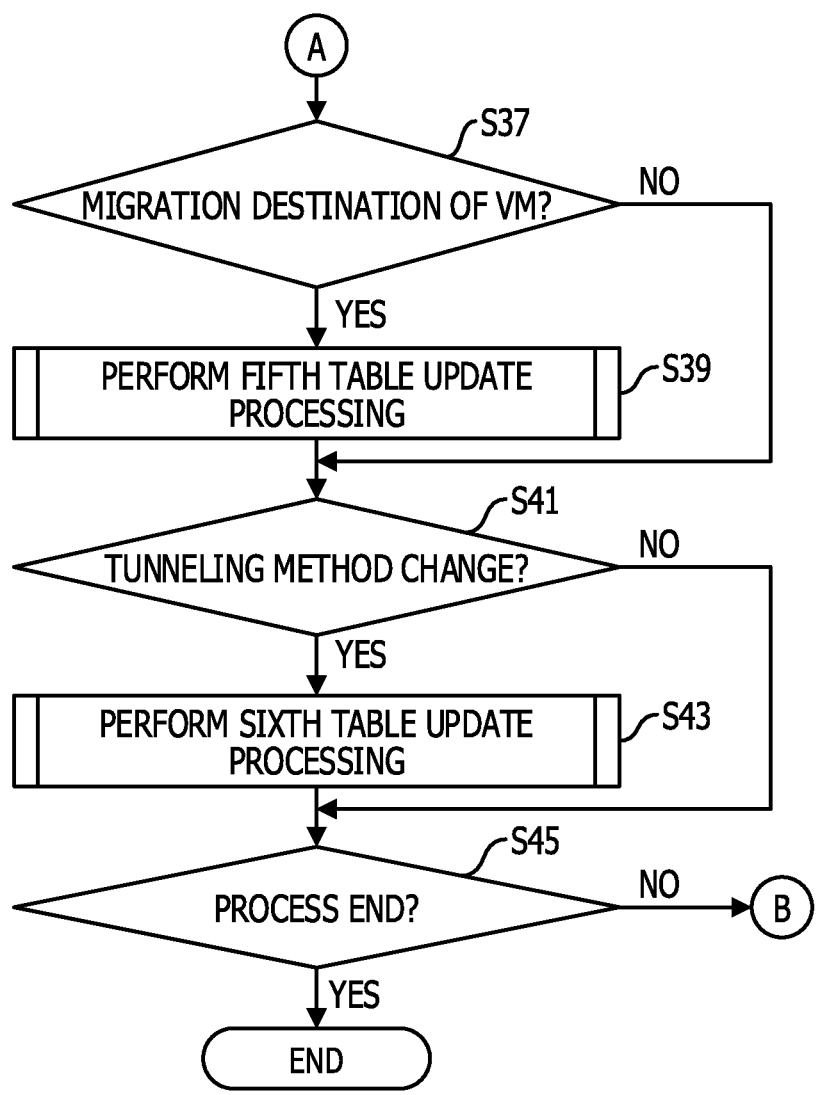
FIG. 10 is a flowchart illustrating a processing flow of the table update unit.

The table update unit 201 determines whether or not it has received an MTU change notification from the MTU detection unit 203 (step S21 in FIG. 9). If no MTU change notification has been received, the process moves to step S25. If any MTU change notification has been received, the table update unit 201 performs first table update processing (step S23). The first table update processing will be described later. Then, the process moves to step S25.

The table update unit 201 determines whether or not a command to launch a virtual machine (that is, a guest OS) has been issued to the hypervisor 100 by the operation management apparatus 10 or the like (step S25). For example, this event may be detected from a notification that the hypervisor 100 which has received a launch command issues to the table update unit 201. If the launch of a virtual machine has not been commanded, the process moves to step S29. If the launch of a virtual machine has been commanded, the table update unit 201 performs second table update processing (step S27). The second table update processing will be described later. Then, the process moves to step S29.

The table update unit 201 also determines whether or not a command to stop a virtual machine (that is, a guest OS) has been issued to the hypervisor 100 by the operation management apparatus 10 or the like (step S29). For example, this event may be detected from a notification that the hypervisor 100 which has received a stop command issues to the table update unit 201. If the stopping of a virtual machine has not been commanded, the process moves to step S33. If the stopping of a virtual machine has been commanded, the table update unit 201 performs third table update processing (step S31). The third table update processing will be described later. Then, the process moves to step S33.

The table update unit 201 furthermore determines whether or not the local physical machine is the source of migration of a virtual machine (that is, a guest OS) (step S33). For example, this event may be detected from a notification that the hypervisor 100 which has received a migration command issues to the table update unit 201. If the local physical machine is not the source of migration of a virtual machine, the process moves to the process in FIG. 10 via a reference A. If the local physical machine is the source of migration of a virtual machine, the table update unit 201 performs fourth table update processing (step S35). The fourth table update processing will be described later. Then, the process moves to the process in FIG. 10 via the reference A.

The table update unit 201 furthermore determines whether or not the local physical machine is the destination of migration of a virtual machine (that is, a guest OS) (step S37). For example, this event may be detected from a notification that the hypervisor 100 which has received a migration command issues to the table update unit 201. If the local physical machine is not the destination of migration of a virtual machine, the process moves to step S41. If the local physical machine is the destination of migration of a virtual machine, the table update unit 201 performs fifth table update processing (step S39). The fifth table update processing will be described later. Then, the process moves to step S41.

The table update unit 201 furthermore determines whether or not a change in the tunneling method of any network segment has been commanded (step S41). For example, this event may be detected from a notification that the hypervisor 100 which has received a migration command issues to the table update unit 201. A case in which an L2 tunnel is set to be used though no L2 tunnel has been used, an opposite case, and a case in which the tunneling method of an L2 tunnel is changed to another method are all determined to satisfy the condition for this step. If no change in the tunneling method has been commanded for any network segment, the process moves to step S45. If a change in the tunneling method has been commanded for any network segment, the table update unit 201 performs sixth table update processing (step S43). The sixth table update processing will be described later. Then, the process moves to step S45.

The table update unit 201 then determines whether or not ending of the process has been commanded (step S45). For example, if the operation management apparatus 10, the hypervisor 100, or the like issues a command to end the process, the process ends. If it is not the end, the process returns to step S21 via a reference B.

With this method, it becomes possible to update the control table appropriately for various events and to notify the guest OS side of an appropriate data amount as the MTU.

Figure 11:
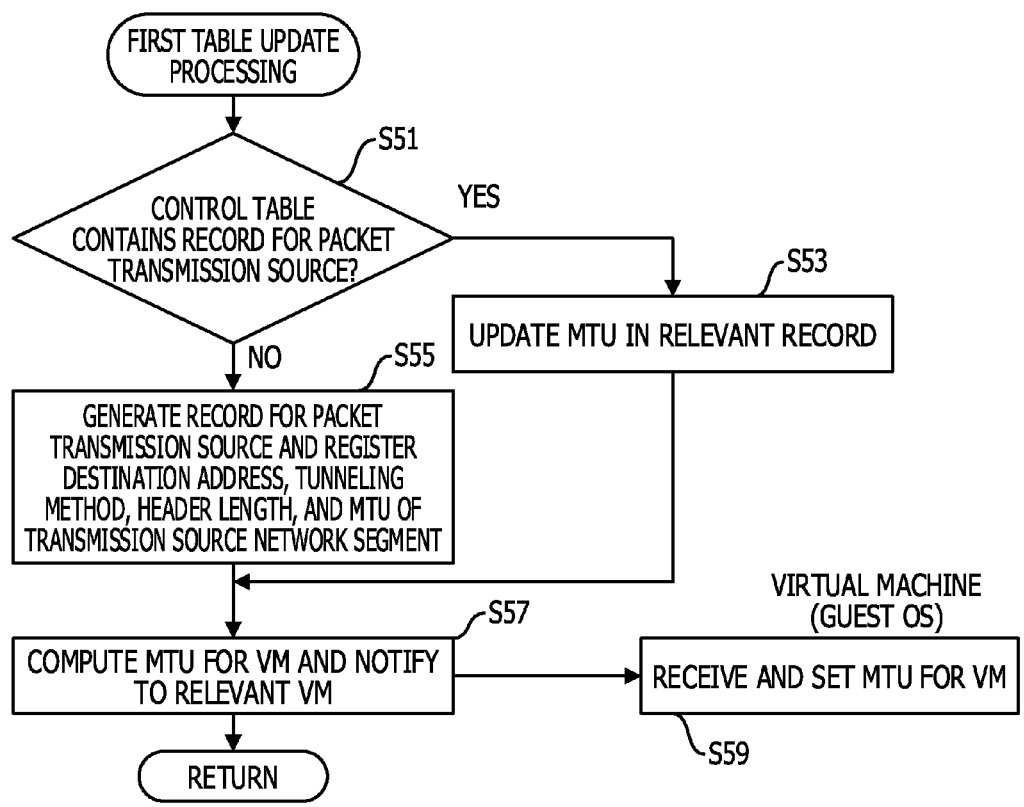
FIG. 11 is a flowchart illustrating a processing flow of a first table update process.

Next, with reference to FIG. 11, the first table update processing will be described below. The table update unit 201 determines whether or not a record for the transmission source of the packet that caused an ICMP packet to be generated is contained in the control table (step S51 in FIG. 11).

If a record for the transmission source of the packet that caused an ICMP packet to be generated is contained in the control table, the table update unit 201 updates the MTUs in the record for the transmission source of the packet that caused an ICMP packet to be generated and the record for a virtual machine (that is, a guest OS) that belongs to the network segment to which the transmission source belongs (step S53). The process then moves to step S57.

For example, the table update unit 201 identifies the record of a virtual machine that belongs to the same network segment by finding, in the control table, a record that has the same MAC address of the destination endpoint as the MAC address of the destination endpoint in the record of the transmission source of the packet which caused an ICMP packet to be generated. The table update unit 201 may acquire the MAC address of a virtual machine which belongs to the same network segment by sending an inquiry to the configuration management unit 110 of the hypervisor 100 and searching the control table for the MAC address.

If a record for the transmission source of the packet that caused an ICMP packet to be generated is not contained in the control table, the table update unit 201 generates a record for the transmission source of the packet that caused the ICMP packet to be generated, acquires the MAC address of the destination endpoint, the tunneling method, the header length, and the MTU of the network segment of the transmission source, and registers them in the control table (step S55).

The MAC address of the destination endpoint and the tunneling method are acquired by, for example, sending an inquiry to the configuration management unit 110 of the hypervisor 100 with the MAC address of the transmission source. The header length corresponding to the tunneling method is acquired from the data storage unit 220. Records for the virtual machines which belong to the same network segment may be updated in this step as in step S53.

The table update unit 201 computes an MTU for the virtual machine (that is, a guest OS) represented by the record, the MTU of which has been updated or registered, as the current MTU minus the header length and outputs the computed MTU to the notification unit 202. The notification unit 202 notifies the virtual machine represented by the record, the MTU of which has been updated or registered, of the computed MTU for the virtual machine (step S57).

In response to this, when the guest agent 300 of the virtual machine (that is, a guest OS) receives the MTU for the virtual machine, the MTU setting unit 301 in the guest agent 300 stores the MTU for the virtual machine in the setting data storage unit 310 (step S59).

Because, with this processing, the virtual machine (that is, a guest OS) side generates a packet corresponding to the MTU notified after the change, it becomes possible to perform data communication without a decrease in throughput.

Next, with reference to FIG. 12, the second table update processing, which is performed when the launch of a virtual machine is detected, will be described below.

Figure 12:
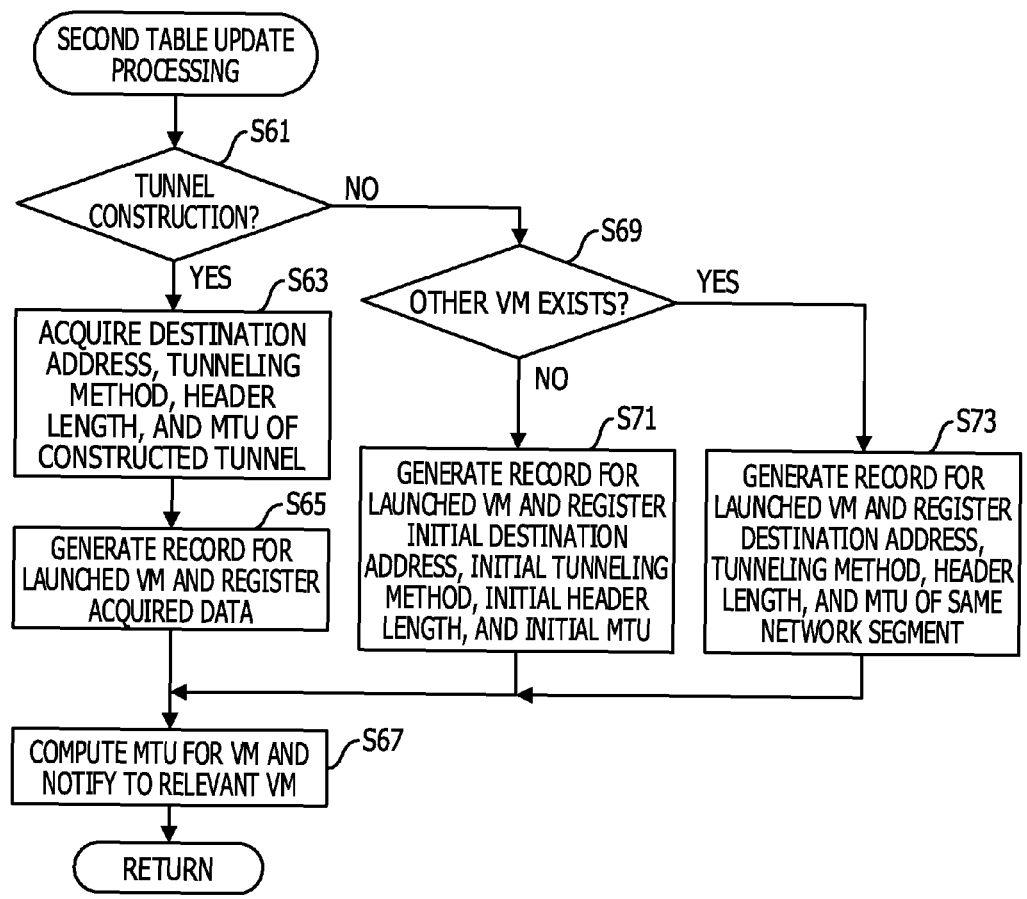
FIG. 12 is a flowchart illustrating a processing flow of a second table update process.

The table update unit 201 determines whether or not an L2 tunnel is constructed in response to the launch of a virtual machine (that is, a guest OS) (step S61 in FIG. 12).

Figure 13A:
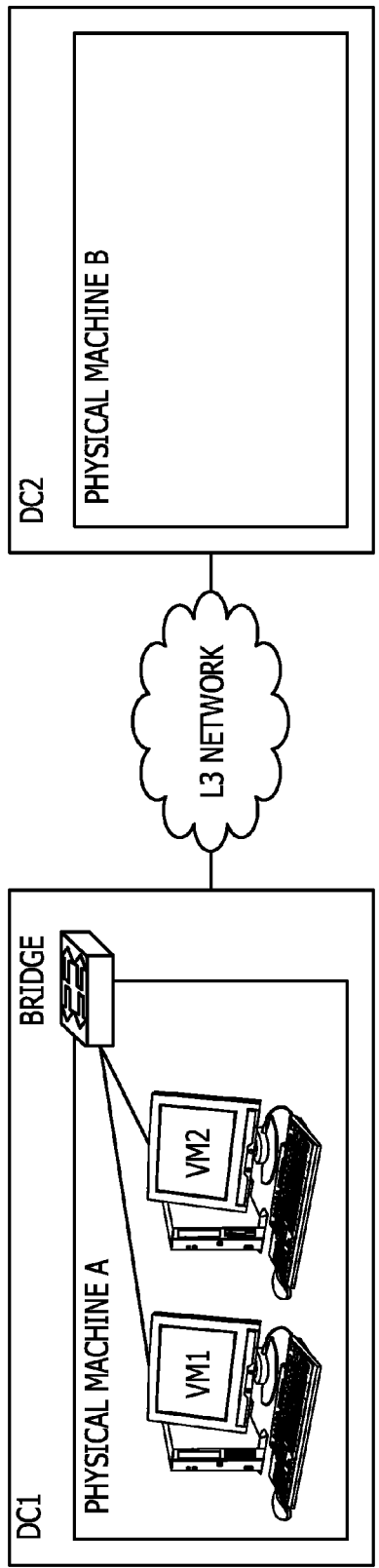

For example, as depicted in FIG. 13A, it is assumed that a physical machine A is installed in a data center DC1, a physical machine B is installed in a data center DC2, and the data center DC1 is connected to the data center DC2 via an L3 network. It is also assumed that virtual machines VM1 and VM2 which belong to a certain network segment are running on the physical machine A and no virtual machine connected to the network segment is running on the physical machine B. In such a situation, if a virtual machine VM3 is launched on the physical machine B, the network structure transitions to the state depicted in FIG. 13B.

Figure 13B:
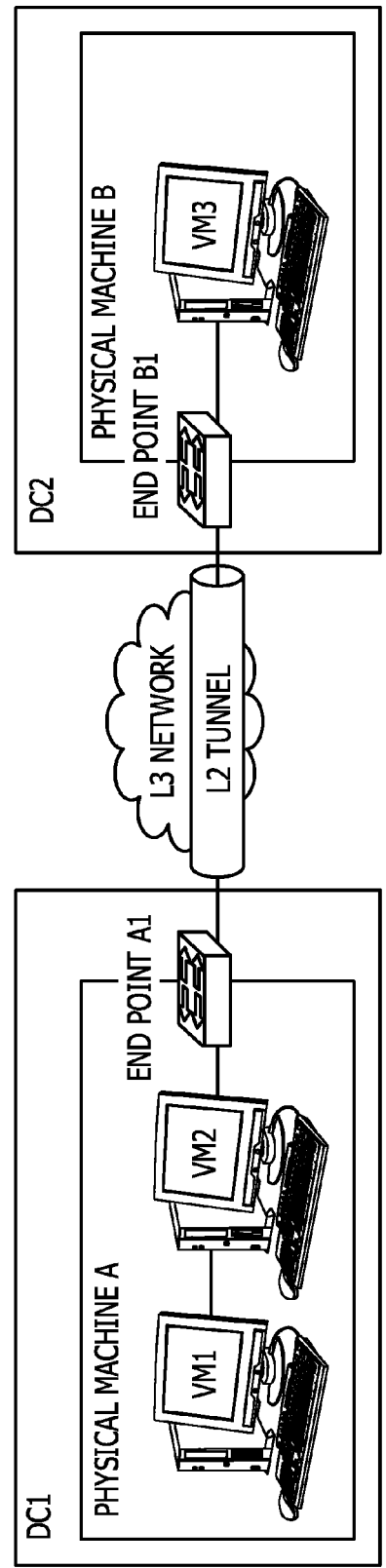

In FIG. 13B, between the data center DC1 and the data center DC2, for example, an L2 tunnel of the GRE type is constructed. Then, a destination endpoint A1 of the L2 tunnel is constructed on the physical machine A and configured so as to be connected to the virtual machines VM1 and VM2. On the physical machine B, a destination endpoint B1 of the L2 tunnel is constructed and configured so as to be connected to the virtual machine VM3. In step S61, whether or not the network structure is in the state in FIG. 13B is determined.

If an L2 tunnel is constructed in response to the launch of a virtual machine, the table update unit 201 acquires the MAC address of the destination endpoint, tunneling method, header length, and MTU of the L2 tunnel to be constructed (step S63). For example, the MAC address of the destination endpoint and tunneling method of the L2 tunnel are acquired from the configuration management unit 110 in the hypervisor 100 and, for the header length, a value corresponding to the tunneling method is read out from the data storage unit 220. The MTU is acquired from the configuration management unit 110 in the hypervisor 100 or the like if it is possible. If it is not possible, the MTU may be acquired by sending a packet conditioned to have a large MTU to the MAC address of the destination endpoint once and receiving an ICMP packet.

Then, the table update unit 201 generates a record for the launched virtual machine (that is, a guest OS) in the control table and registers the acquired data (step S65).

FIG. 13C illustrates the control table for the example in FIG. 13B. In the example in FIG. 13C, the MAC address of the launched virtual machine is "MAC_3", the MAC address of the destination endpoint A1 is "MAC_A1", the tunneling method is "GRE", the header length is "42", and the MTU is "1460".

The table update unit 201 computes an MTU for the virtual machine (that is, a guest OS) represented by the record, the MTU of which has been updated or registered, as the current MTU minus the header length and outputs the computed MTU to the notification unit 202. The notification unit 202 notifies the virtual machine represented by the record, the MTU of which has been updated or registered, of the computed MTU for the virtual machine (step S67).

In response to this, when the guest agent 300 of the virtual machine (that is, a guest OS) receives the MTU for the virtual machine, the MTU setting unit 301 in the guest agent 300 stores the MTU for the virtual machine in the setting data storage unit 310.

In the case of the launch of a virtual machine (that is, a guest OS) which does not accompany the construction of a tunnel, the table update unit 201 determines whether or not other virtual machines which belong to the network segment to which the launched virtual machine belongs are running on the local physical machine (step S69). For example, the table update unit 201 acquires the MAC address of the other virtual machines which belong to the network segment to which the launched virtual machine belongs from the configuration management unit 110.

If no other virtual machine is running on the local physical machine, the table update unit 201 generates a record for the launched virtual machine and registers the MAC address of an initial destination endpoint, an initial tunneling method (typically None), an initial header length (typically 0), and an initial MTU (typically 1500) (step S71). The process then moves to step S67. When a virtual machine is launched in an isolated manner as illustrated above, the processing in step S71 is performed.

If any other virtual machine that belongs to the network segment to which the launched virtual machine belongs is running on the local physical machine, the table update unit 201 generates a record for the launched virtual machine and registers the MAC address of the destination endpoint, tunneling method, header length, and MTU for the other virtual machine which belongs to the same network segment (step S73).

Because the fact that another virtual machine which belongs to the same network segment is running on the local physical machine means that the other virtual machine communicates by the same communication method, the MAC address of the destination endpoint, tunneling method, header length, and MTU for the other virtual machines are used without any change. If an L2 tunnel has been constructed, the L2 tunnel is used. If no L2 tunnel has been constructed, a bridge of the host OS is used. The process then moves to step S67.

As illustrated above, by updating the control table appropriately at a time of the launch of a virtual machine, the launched virtual machine of an appropriate MTU may be notified.

Next, the third table update processing which is performed in response to the stopping of a virtual machine will be described with reference to FIG. 14.

Figure 14:
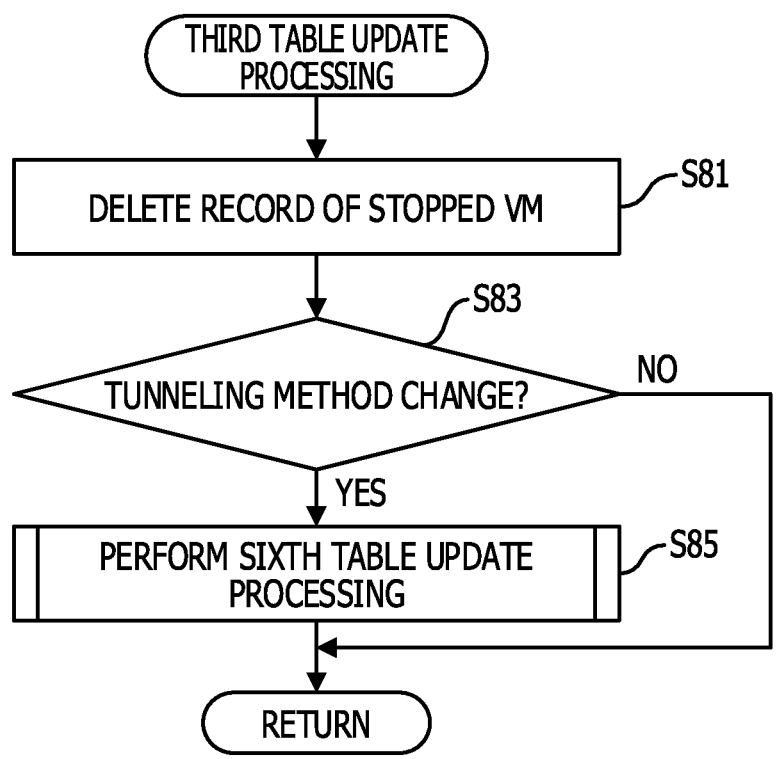
FIG. 14 is a flowchart illustrating a processing flow of a third table update process.

The table update unit 201 deletes the record of the stopped virtual machine (that is, a guest OS) from the control table (step S81 in FIG. 14).

Then, the table update unit 201 determines whether or not a change in the tunneling method took place in response to the stopping of the virtual machine (step S83). For example, the table update unit 201 sends an inquiry to the configuration management unit 110 in the hypervisor 100 or determines whether or not it has been notified of a change in the L2 tunnel from the configuration management unit 110.

For example, in the situation depicted in FIG. 13B, if the virtual machine VM3 is stopped, communication between the data centers DC1 and DC2 is also ceased. Thus, there is a case in which the L2 tunnel is removed in order to return the configuration to the state depicted in FIG. 13A.

If the tunneling method is changed as illustrated above, the table update unit 201 performs sixth table update processing, which is executed when there is a change in the tunneling method (step S85). If the tunneling method is not changed, however, the process returns to the calling process.

Next, the sixth table update processing, which is executed when there is a change in the tunneling method, will be described below referring to FIGS. 15 to 16B.

Figure 15:
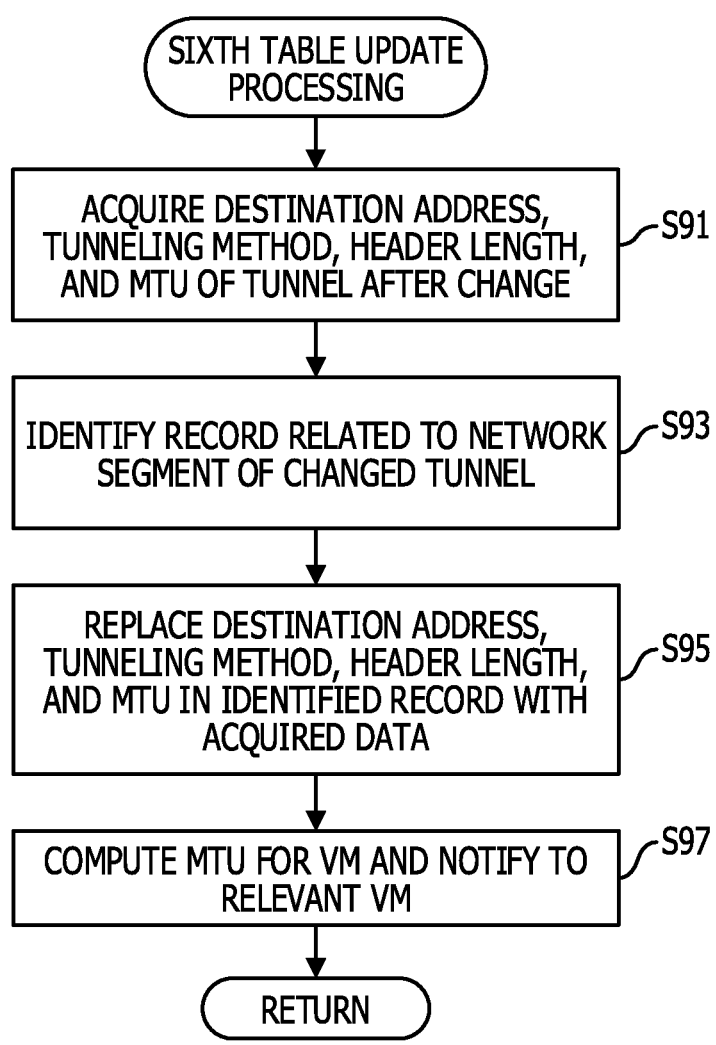
FIG. 15 is a flowchart illustrating a processing flow of a sixth table update process.

The table update unit 201 acquires the MAC address of the destination endpoint, tunneling method, header length, and MTU of the L2 tunnel after the change (step S91 in FIG. 15). For example, the MAC address of the destination endpoint and tunneling method of the L2 tunnel is acquired from the configuration management unit 110 in the hypervisor 100 and, for the header length, a value corresponding to the tunneling method is read out from the data storage unit 220. The MTU is acquired from the configuration management unit 110 in the hypervisor 100 or the like, if it is possible. If it is not possible, the MTU may be acquired by sending a packet conditioned to have a large MTU to the MAC address of the destination endpoint once and receiving an ICMP packet.

The table update unit 201 identifies records, in the control table, for virtual machines (that is, guest OSes) that belong to the network segment which is related to the changed tunnel (step S93).

For example, the table update unit 201 acquires the MAC addresses of the virtual machines that belong to the network segment which is related to the changed tunnel from the configuration management unit 110 in the hypervisor 100 and extracts records having the MAC addresses as the MAC addresses of the guest OSes.

The table update unit 201 replaces the MAC addresses of the destination endpoint, tunneling methods of the L2 tunnel, header lengths, and MTUs in the identified records with the data acquired in step S91 (step S95).

The table update unit 201 computes an MTU for the virtual machine (that is, a guest OS) represented by the record, the MTU of which has been updated or registered, as the current MTU minus the header length and outputs the computed MTU to the notification unit 202. The notification unit 202 notifies the virtual machine represented by the record, the MTU of which has been updated or registered, of the computed MTU for the virtual machine (step S97).

In response to this, when the guest agent 300 on the virtual machine (that is, a guest OS) receives the MTU for the virtual machine, its MTU setting unit 301 stores the MTU for the virtual machine in the setting data storage unit 310.

For example, because the virtual machine VM3 is launched in the data center DC2 in FIGS. 13A and 13B, the tunneling method has to be changed in the data center DC1. That is, although, in FIG. 13A, the virtual machines VM1 and VM2, which belong to the same network segment, are connected via a bridge, the virtual machine VM3, which belongs to the network segment and is launched in the data center DC2, causes the virtual machines VM1 to VM3 to communicate with each other via the endpoint A1 of the L2 tunnel, the L2 tunnel, and the endpoint B1 of the L2 tunnel in FIG. 13B.

For the condition depicted in FIG. 13A, the control table of the physical machine A has entries as depicted in FIG. 16A. In the example in FIG. 16A, the MAC address of the destination endpoint is "MAC_A1", which is the MAC address of the bridge, and the tunneling method and header length are "None" and "0", respectively, because no L2 tunnel has been constructed.

When the configuration transitions to the state depicted in FIG. 13B, the control table of the physical machine A has entries as depicted in FIG. 16B. The tunneling method is "GRE", the header length is "42", and the MTU is "1460" for the L2 tunnel, the same as the records depicted in FIG. 13C. However, the MAC address of the destination endpoint is "MAC_B1", the MAC address of the endpoint B1 on the data center DC2 side.

As illustrated above, when a change takes place in the tunneling method, updating the control table in accordance with the change makes it possible to notify a virtual machine (that is, a guest OS) of an appropriate data amount of the MTU.

Next, the fourth table update processing and the fifth table update processing, which are performed when the migration of a virtual machine is conducted, will be described below.

First, the fourth table update processing, performed on a physical machine, which is the migration source, will be described with reference to FIGS. 17 to 29.

Figure 17:
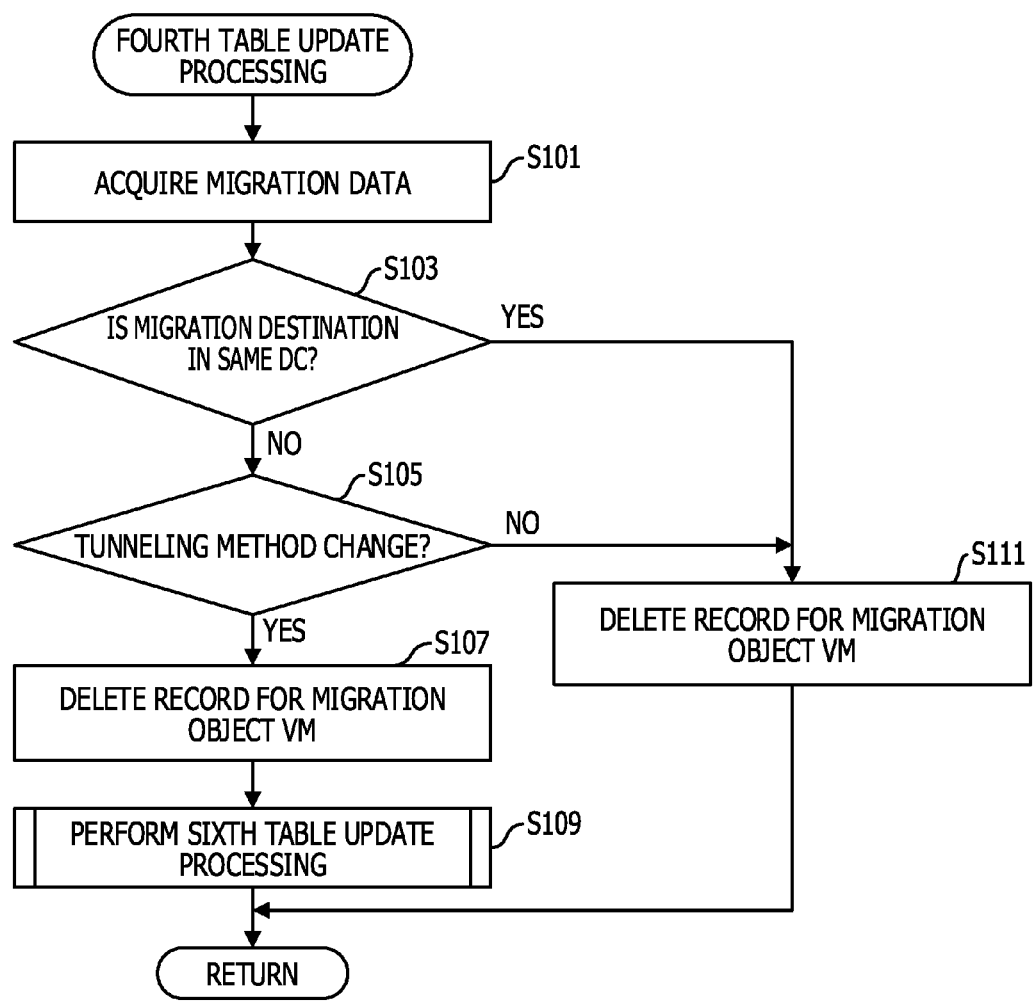
FIG. 17 is a flowchart illustrating a processing flow of a fourth table update process.

The table update unit 201 acquires migration data from the hypervisor 100 (step S101 in FIG. 17). Specifically, the migration data include the MAC address of a virtual machine, which is the destination of the migration, data of the network segment to which the virtual machine, the destination of the migration, belongs, a communication method to be used (such as L2 tunneling method), data of the destination of the migration (such as the destination data center and the address of the destination physical machine), and so on.

The table update unit 201 then determines whether or not the migration destination is in the same data center (step S103). If the migration destination is in the same data center, the table update unit 201 deletes the record of the virtual machine (that is, a guest OS) that is the object of the migration from the control table (step S111). The process then returns to the calling process.

Figure 18:
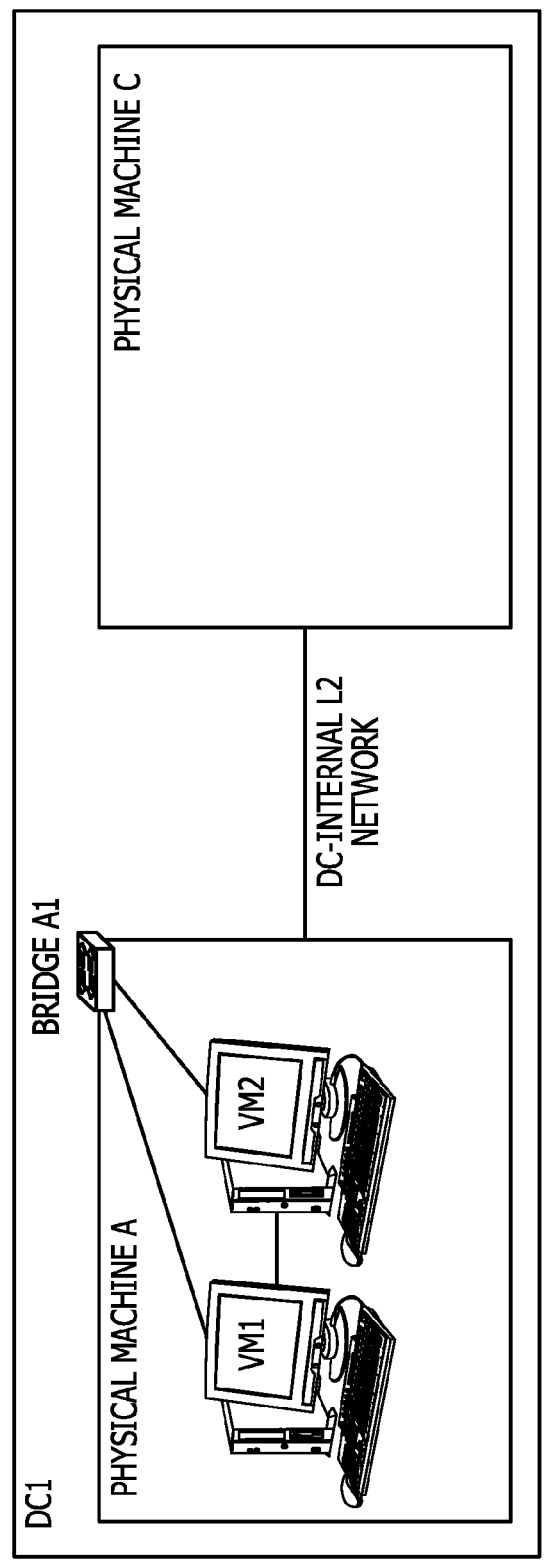
FIG. 18 is a diagram to describe a migration in a data center.

For example, a case in which, as depicted in FIG. 18, the physical machines A and C in the data center DC1 are interconnected via an L2 network in the data center is considered. In this case, because the virtual machines VM1 and VM2 are running on the physical machine A, the control table depicted in FIG. 19 is held in the physical machine A.

In the example in FIG. 19, a record with the MAC address "MAC_1" of the virtual machine VM1 and a record with the MAC address "MAC_2" of the virtual machine VM2 are contained in the control table. Because no L2 tunnel is constructed, the MAC address "MAC_A1" of the bridge A1 is set to the MAC address of the destination endpoint and "None" is set to the tunneling method.

Figure 20:
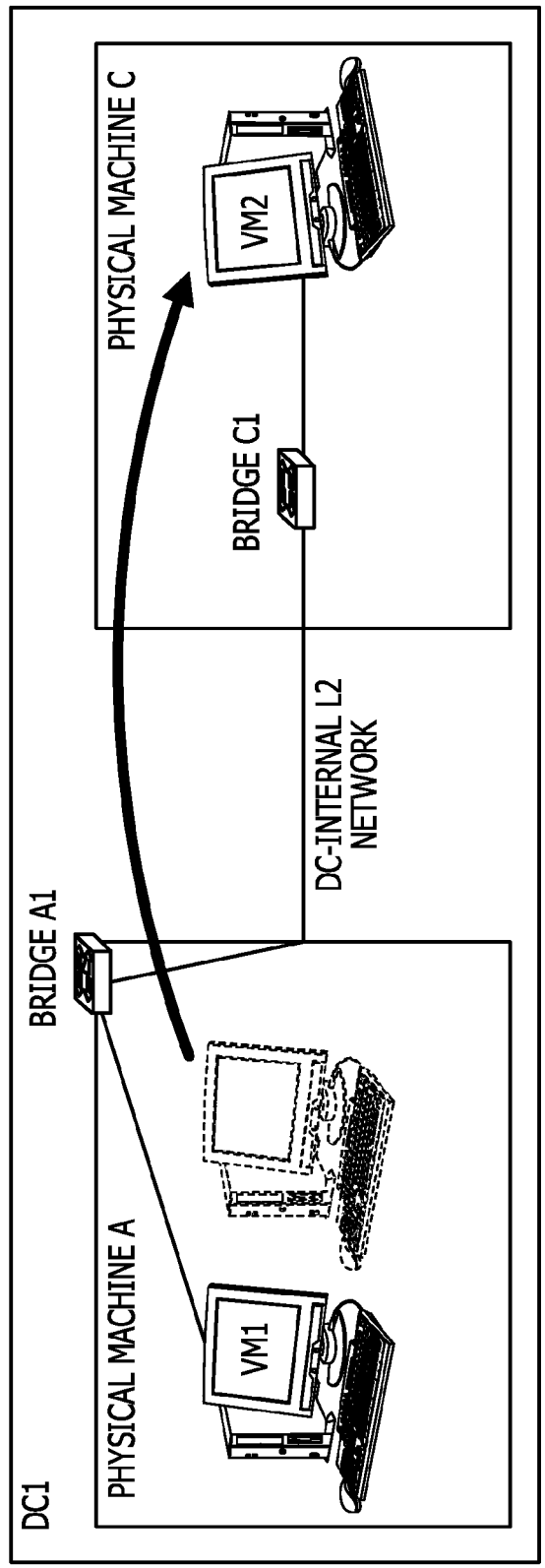
FIG. 20 is a diagram to describe the migration in the data center.

However, if a migration of the virtual machine VM2 from the physical machine A to the physical machine C in the data center DC1 takes place as depicted in FIG. 20, the control table on the physical machine A, the migration source, changes to the control table depicted in FIG. 21. Because no L2 tunnel is constructed in this case, the record for the virtual machine VM2 is simply deleted.

If the migration destination does not belong to the same data center, the table update unit 201 determines whether or not the tunneling method is changed (step S105). Cases in which there is a change in the tunneling method include, for example, a case in which other virtual machines belonging to the same network segment disappear from the physical machine, which is the migration source, due to migration. On the other hand, cases in which there is no change in the tunneling method include, for example, a case in which, even if a virtual machine disappears due to migration, other virtual machines belonging to the same network segment exist. If the tunneling method is not changed, the process moves to step S111.

Figure 22:
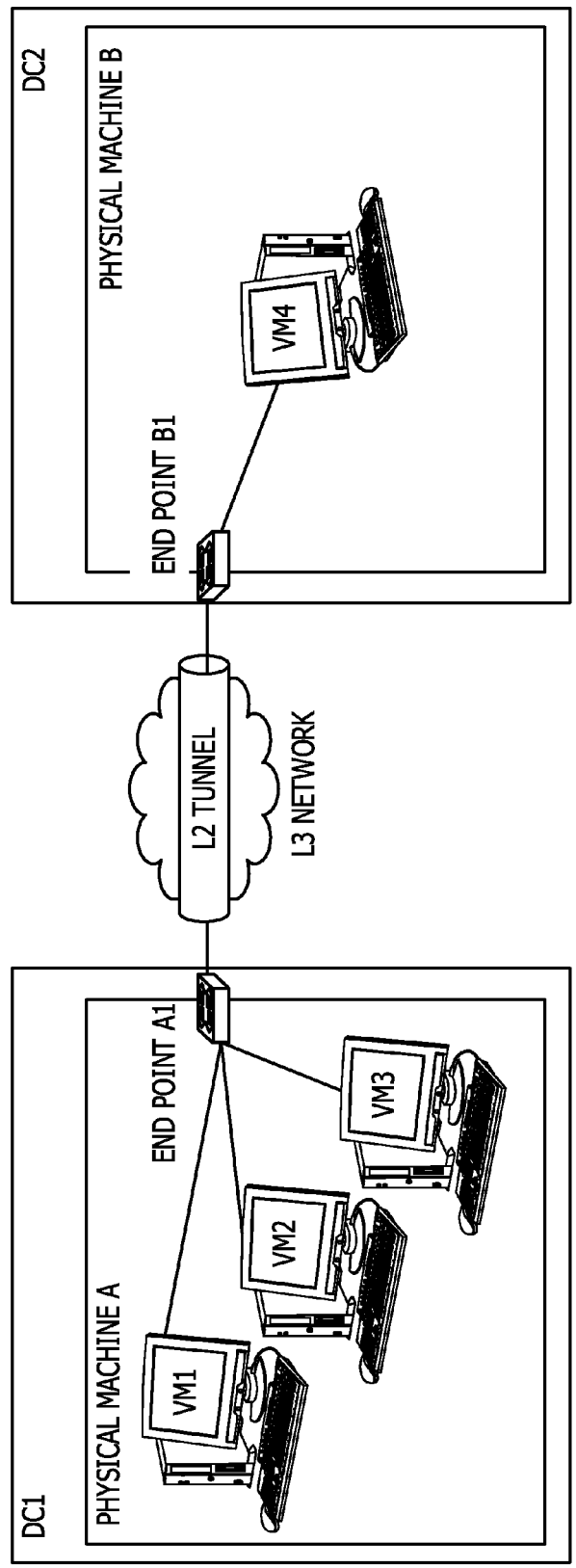
FIG. 22 is a diagram to describe a migration between data centers.
Figure 23:
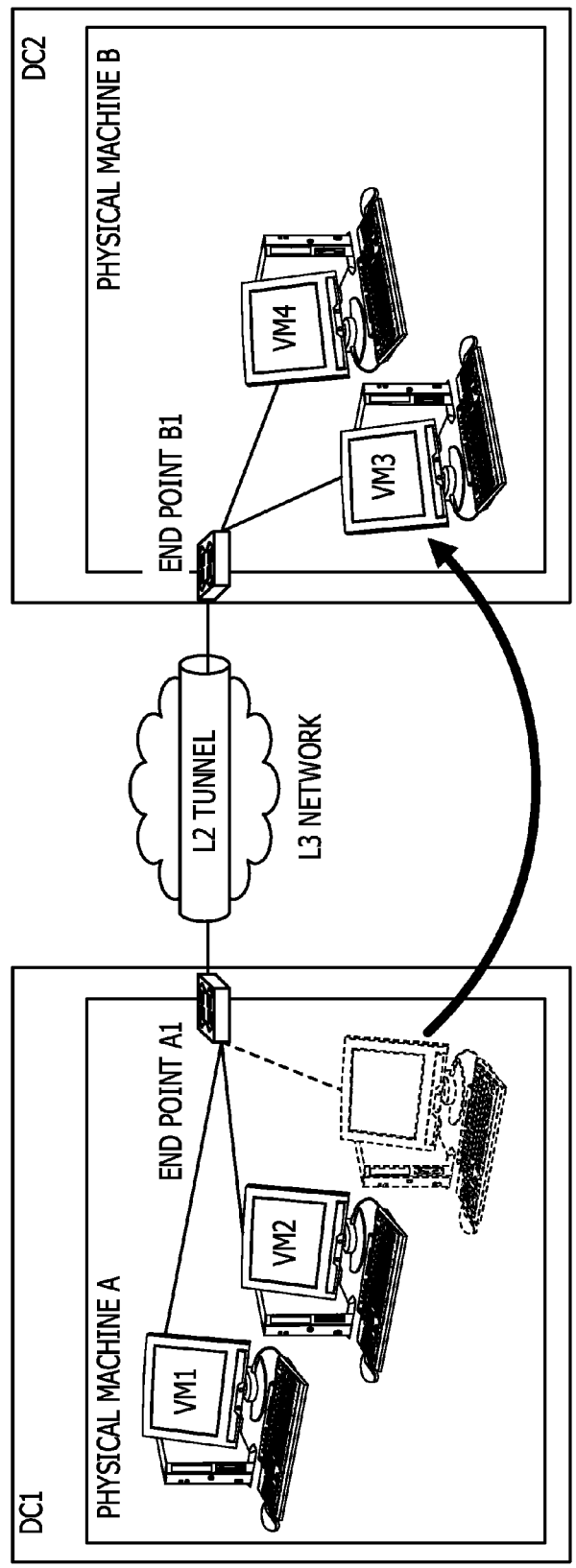
FIG. 23 is a diagram to describe the migration between the data centers.

It is assumed that, when the virtual machines VM1 to VM3 are running on the physical machine A in the data center DC1 and a virtual machine VM4, which belongs to the network segment to which the virtual machines VM1 to VM3 belong, is running on the physical machine B in the data center DC2 as depicted in FIG. 22, the virtual machine VM3 is migrated to the physical machine B. In this case, because the L2 tunnel has already been constructed between the data centers DC1 and DC2, the L2 tunnel usually does not have to be changed even after the virtual machine VM3 has moved as depicted in FIG. 23.

Accordingly, in the state depicted in FIG. 22, the control table on the physical machine A contains three records for the virtual machines VM1 to VM3 and a piece of data on the L2 tunnel with a tunneling method of GRE is registered in each record as depicted in FIG. 24. Even if the configuration transitions to the state depicted in FIG. 23 afterward, the record of the virtual machine VM3, which has left the physical machine A due to the migration, is just deleted from the control table on the physical machine A as depicted in FIG. 25.

If the tunneling method is changed, however, the table update unit 201 deletes the record of the virtual machine (that is, a guest OS) to be migrated from the control table (step S107). This is the same as the processing in step S111.

The table update unit 201, in addition, performs the sixth table update processing (step S109). The sixth table update processing has already been described referring to FIG. 15, so it will not be described again.

Figure 26:
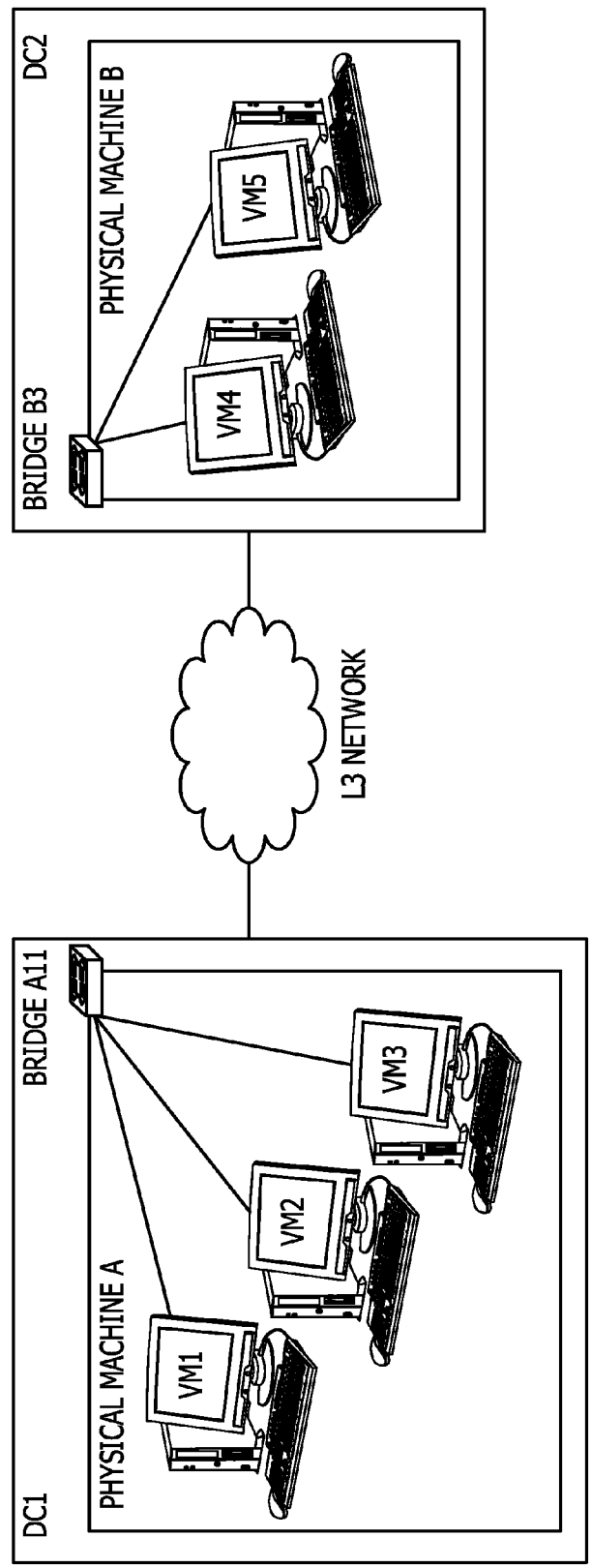
FIG. 26 is a diagram to describe a migration between the data centers.

In another example, the virtual machines VM1 to VM3 are running on the physical machine A which is installed in the data center DC1 and belong to the same network segment as depicted in FIG. 26. The virtual machines VM4 and VM5 are running on the physical machine B which is installed in the data center DC2 and belong to a network segment that is different from the network segment to which the virtual machines VM1 to VM3 belong. In this case, the virtual machines VM1 to VM3 are interconnected via a bridge A11 on the physical machine A, the virtual machines VM4 and VM5 are interconnected via a bridge B3 on the physical machine B, and no L2 tunnel is implemented between the data centers.

In this case, the control table on the physical machine A has entries as depicted in FIG. 27. Because communication is conducted within the same physical machine in the data center as illustrated above, all records have "None" for the tunneling method.

Figure 28:
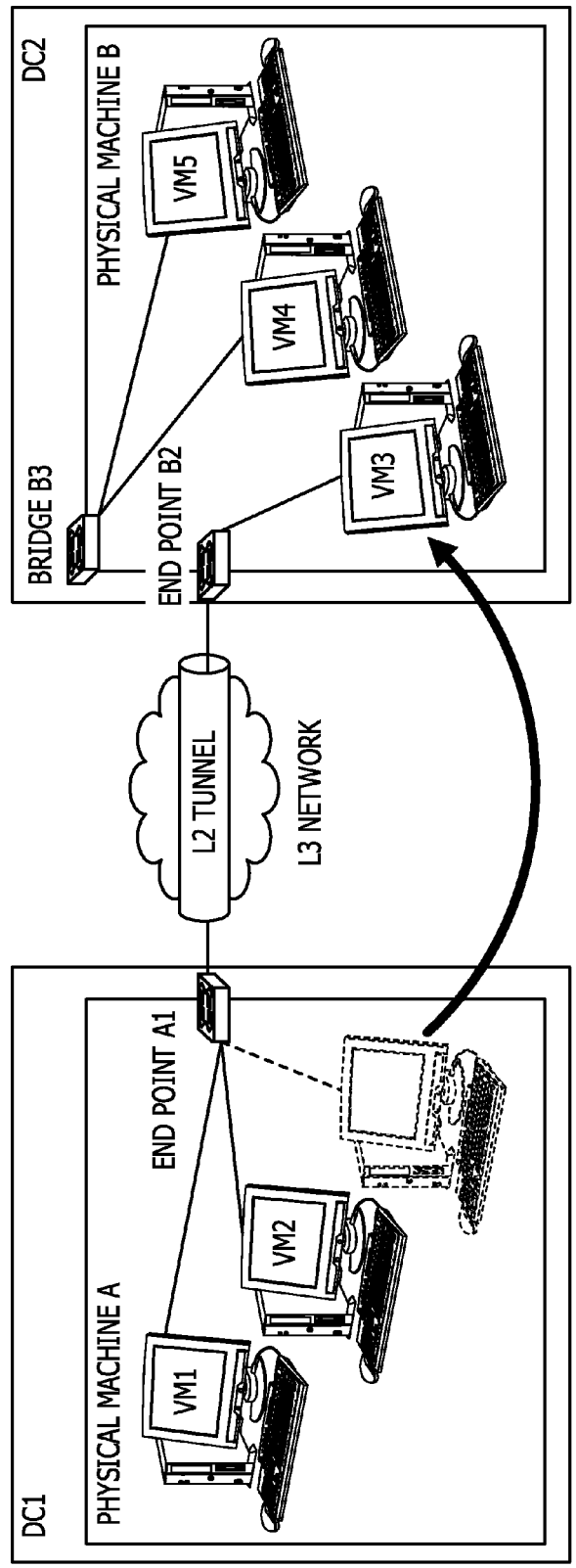
FIG. 28 is a diagram to describe the migration between the data centers.

If the virtual machine VM3 moves to the physical machine B in the data center DC2 afterward as depicted in FIG. 28, an L2 tunnel is constructed in order for the virtual machine VM3 to communicate with the virtual machines VM1 and VM2 on the physical machine A in the data center DC1. Then, endpoints A1 and B2 of the L2 tunnel are constructed on the physical machines A and B, respectively.

Then, the entries in the control table on the physical machine A change to the composition depicted in FIG. 29. In the example in FIG. 29, the record of the virtual machine VM3, which has moved, has been deleted. The records of the virtual machines VM1 and VM2 have also been updated so as to use the newly constructed L2 tunnel. The records of the virtual machines VM1 and VM2 are updated by the sixth table update processing.

Next, the fifth table update processing, which is performed on the physical machine that is the migration destination, will be described below with reference to FIGS. 30 to 35.

Figure 30:
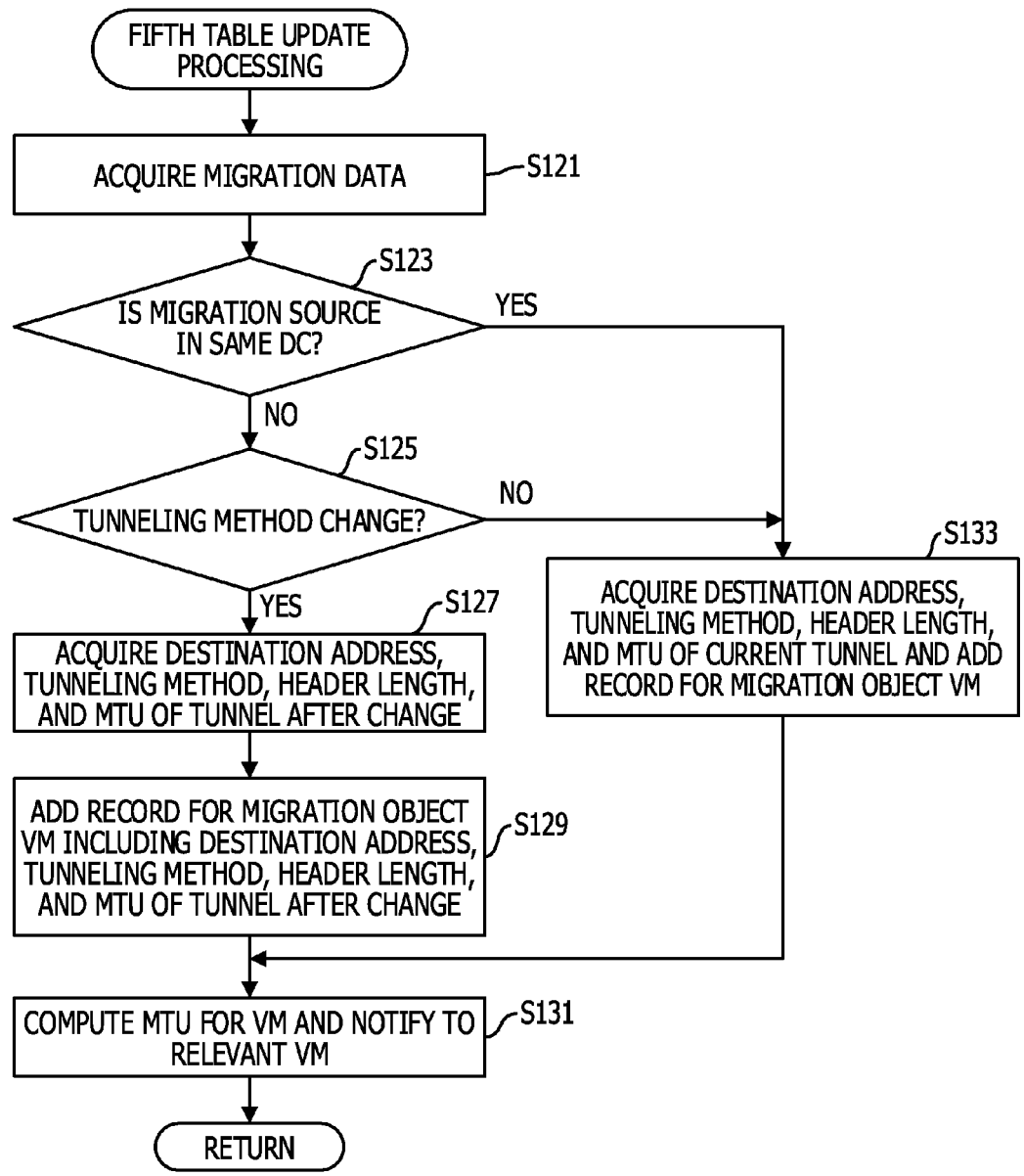
FIG. 30 is a flowchart illustrating a processing flow of a fifth table update process.

The table update unit 201 acquires data on the migration from the hypervisor 100 (step S121 in FIG. 30). Specifically, the table update unit 201 acquires the MAC address of the virtual machine that is the object of the migration, data on the network segment to which the virtual machine that is the object of the destination belongs, a communication method to be used (for example, tunneling method of an L2 tunnel), data on the migration source (the data center where the migration source resides and the address of the physical machine to be migrated), and so on.

The table update unit 201 then determines whether or not the migration source is in the same data center (step S123). If the migration source is in the same data center, the table update unit 201 acquires the MAC address of the destination endpoint, tunneling method, header length, and MTU of the current communication method (for example, tunneling) and, in the control table, adds a record, which contains the acquired data, for the virtual machine that is the object of the migration (step S133).

In this embodiment, on the assumption that an L2 network is ready for use in the data center, the table update unit 201 acquires "None" as an initial communication method, "MAC_C1" as the MAC address of a bridge which will be the destination endpoint, "0" as an initial header length, and "1500" as an initial MTU and registers them in the control table with the MAC address of the virtual machine VM2 that is the object of the migration.

When the configuration depicted in FIG. 18 transitions to the configuration depicted in FIG. 20 as described above, the state of the control table on the physical machine C which is the migration destination changes from the state in which no entries is registered to the state depicted in FIG. 31. In FIG. 31, a record which contains the MAC address "MAC_2" of the virtual machine VM2 and the above-described data is added.

The table update unit 201 computes an MTU for the virtual machine (that is, a guest OS) represented by the record, the MTU of which has been updated or registered, as the current MTU minus the header length and outputs the computed MTU to the notification unit 202. The notification unit 202 notified the virtual machine represented by the record, the MTU of which has been updated or registered, of the computed MTU for the virtual machine (step S131).

In response to this, when the guest agent 300 on the virtual machine (that is, a guest OS) receives the MTU for the virtual machine, its MTU setting unit 301 stores the MTU for the virtual machine in the setting data storage unit 310.

If the migration source does not belong to the same data center, the table update unit 201 determines whether or not the tunneling method is changed (step S125). If the tunneling method is not changed, the process moves to step S133.

If the configuration depicted in FIG. 22 transitions to the configuration depicted in FIG. 23, the tunneling method is not changed. In this case, the control table on the physical machine B has an entry as depicted in FIG. 32 before the migration. That is, for the MAC address "MAC_4" of the virtual machine VM4, "MAC_A1", "GRE", "42", and "1460" are registered as the MAC address of the destination endpoint, tunneling method, header length, and MTU, respectively.

After the migration, however, the control table has entries as depicted in FIG. 33. In this case, because the virtual machine VM4, which belongs to the same network segment, has already been registered, a record for the virtual machine VM3, containing data similar to the data of the virtual machine VM4, is added.

If the tunneling method is changed, the table update unit 201 acquires the MAC address of the destination endpoint, tunneling method, header length, and MTU of the L2 tunnel after the change (step S127). For example, the table update unit 201 acquires the MAC address of the destination endpoint and tunneling method of the L2 tunnel from the configuration management unit 110 and reads out a value for the header length corresponding to the tunneling method from the data storage unit 220 in the hypervisor 100. The MTU is acquired from the configuration management unit 110 in the hypervisor 100 or the like, if it is possible. If it is not possible, the MTU is acquired by sending a packet conditioned to have a large MTU to the MAC address of the destination endpoint once and receiving an ICMP packet.

Then, the table update unit 201 adds a record, in the control table, for the virtual machine to be migrated including the MAC address of the destination endpoint, tunneling method, header length, and MTU of the L2 tunnel after the change (step S129).

In the configuration in FIG. 26, the control table on the physical machine B, the migration destination, has entries depicted in FIG. 34. That is, only the records of the virtual machines VM4 and VM5, which are running on the physical machine B, are contained. When the configuration changes to the configuration depicted in FIG. 28, however, the control table has entries depicted in FIG. 35. As depicted in FIG. 35, although the records of the virtual machines VM4 and VM5 are not affected, for the virtual machine VM3, which has migrated, a new record, including data of the newly constructed L2 tunnel, is added.

After the completion of step S129, the process moves to step S131.

By performing this process, an appropriate MTU is set to the virtual machine side even if a migration takes place.

By performing the above-described process, an appropriate MTU may be informed to the virtual machine (that is, a guest OS) side and may also be set on a virtual machine. With this processing, it is possible to launch fragmentation on a communication path and to avoid a decrease in the throughput.

Another Embodiment

Figure 36:
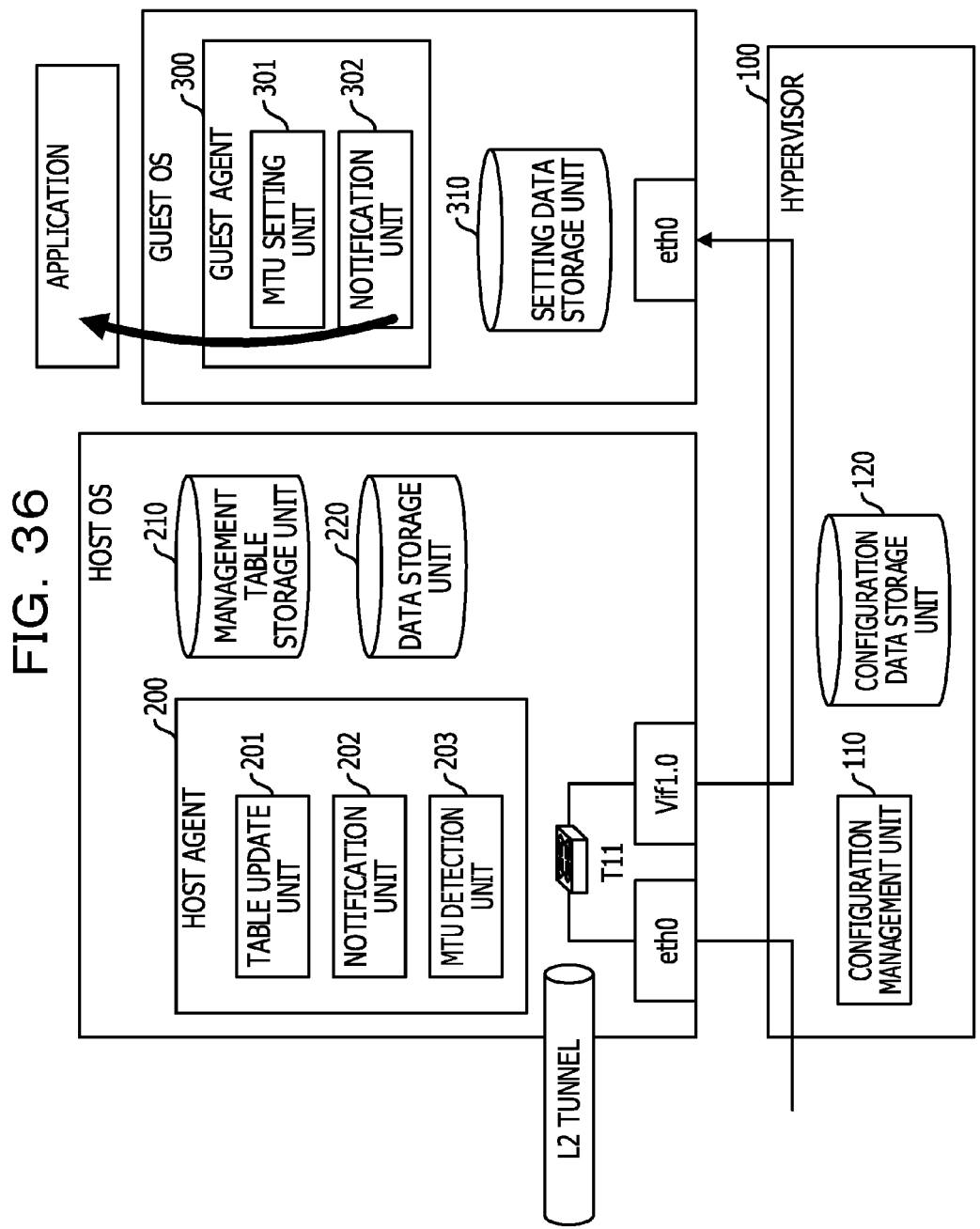
FIG. 36 is a diagram illustrating an example of configuration of a physical server of another embodiment.

In the embodiment described above, an example in which the MTU setting unit 301 of a guest OS sets an appropriate MTU value to the setting data storage unit 310 in FIG. 5 was illustrated. However, there is a case in which an application program executed on a guest OS outputs data in a form optimized for an MTU in the network communication. To cope with such a case, as depicted in FIG. 36, a notification unit 302 may be added to the guest agent 300 and, when an MTU value is acquired from the host agent 200, the MTU value after the change may be notified to application programs by the notification unit 302 via a signal or the like.

The MTU detection unit 203 is able to detect a decrease in the MTU by the above-described process. However, there is a case in which the MTU increases.

Figure 37:
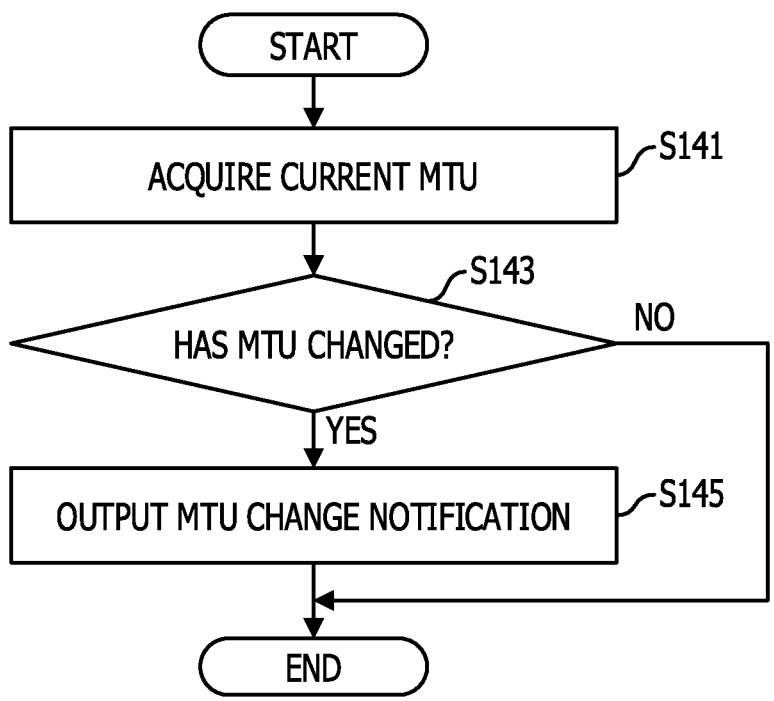
FIG. 37 is a flowchart illustrating a processing flow of an MTU detection unit according to the other embodiment.

To cope with this case, a process such as the process depicted in FIG. 37 may be performed separately. For example, the MTU detection unit 203 acquires the current MTU by, for each record in the control table, forbidding fragmentation and sending a packet of a large size (for example, 1500) to the MAC address of the destination endpoint in the record (step S141 in FIG. 37). The MTU may be specified by outputting ping multiple times with the packet size being altered gradually.

The MTU detection unit 203 then determines whether or not the MTU has changed by comparing the registered MTU with the MTU acquired in step S141 for each record in the control table (step S143). The process ends for the record that has not changed. For the record determined to have changed, the MTU detection unit 203 outputs an MTU change notification to the table update unit 201 (step S145).

If the table update unit 201 performs the process described above in response to the MTU change notification, the current MTU is provided to virtual machines and set to them.

Though embodiments according to this disclosure are described above, this disclosure is not to be limited to the embodiments. For example, the function block diagram is just an example. In some cases, the structure of function blocks is different from an actual program module configuration.

Process steps in the process flow are interchangeable or a plurality of steps may be performed in parallel as long as outputs from the process are the same.

The configuration management unit 110 and the configuration data storage unit 120 may be implemented on the host OS side.

Figure 38:
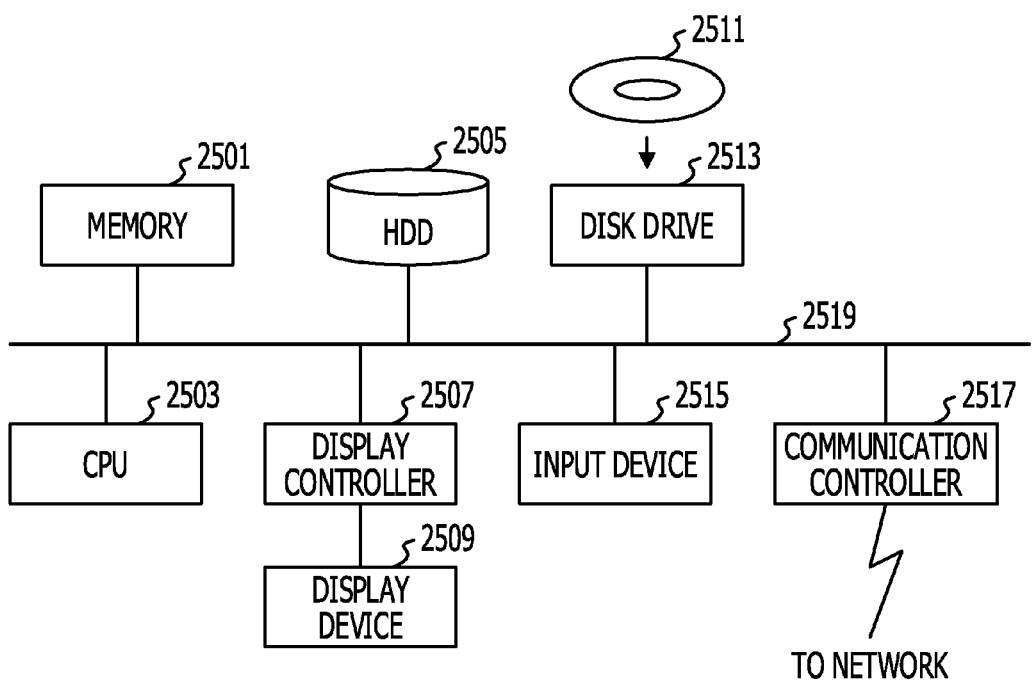
FIG. 38 is a functional block diagram of a computer.

The physical machine described above is a computer apparatus where, as depicted in FIG. 38, a memory 2501, central processing unit (CPU) 2503, hard disk drive (HDD) 2505, display controller 2507 which is connected to a display device 2509, disk drive 2513 for a removable disk 2511, input device 2515, and communication controller 2517 to connect to a network are interconnected via a bus 2519. An operating system (OS) and programs to perform the process of the embodiment are stored in the HDD 2505 and read out from the HDD 2505 to the memory 2501 when they are executed by the CPU 2503. The CPU 2503 controls the display controller 2507, communication controller 2517, and disk drive 2513 to make them perform predefined operations in accordance with the processing of programs. Data on the way of processing are mainly stored in the memory 2501 but may be stored on the HDD 2505. In embodiments of the technology, programs to perform the process described above are stored on and distributed via a computer-readable removable disk 2511 and installed on the HDD 2505 using the disk drive 2513. The programs may be installed on the HDD 2505 via a network such as the Internet and the communication control unit 2517. Such computer device accomplishes the various functions described above by making hardware such as the above-described CPU 2503 and memory 2501 collaborate with programs such as an OS in an organized way.

The embodiment described above is summarized below.

A notification method of this embodiment includes processes, (A) when a change in the maximum transmission unit among packets transmitted on a certain network segment is detected, to identify a virtual machine that belongs to the network segment and is running on the local physical machine (that is, a computer) and (B) to notify the identified virtual machine of a data amount based on the maximum transmission unit after the change (for example, a packet length computed as the maximum transmission unit after the change minus the header length of packets transmitted on the certain network segment).

With these processes, it becomes possible to transmit a packet based on an appropriate MTU on a virtual machine.

In the identification process described above, a change in the maximum transmission unit may be detected by comparing the current maximum transmission unit, stored in the data storage unit to store the current maximum transmission unit for each virtual machine running on the local physical machine and of the virtual machine which belongs to the above-described certain network segment, with the maximum transmission unit after the change. Managing such data storage unit makes it possible to make the detection and notification of a change more efficient.

The notification method may, moreover, include processes, (C) when a change takes place in the communication method in the above-described certain network segment, to identify a virtual machine that belongs to the certain network segment and is running on the local physical machine and (D) to notify the identified virtual machine of a data amount based on the maximum transmission unit specified by the communication method after the change. For example, if a setting in which an L2 tunnel is not used changes to a setting in which an L2 tunnel is used by the identification method, the maximum transmission unit may change. By performing the above process, such a situation may be coped with.

The notification method may, furthermore, include a process, (E) if a virtual machine is launched on the local physical machine, to notify the launched virtual machine of a data amount based on the maximum transmission unit specified by the communication method in the network segment the virtual machine belongs to. Even when a virtual machine is launched, it becomes possible to transmit a packet based on an appropriate MTU for the virtual machine.

Moreover, the notification method may include a process, (F) if a virtual machine is transferred onto the local physical machine, to notify the transferred virtual machine of a data amount based on the maximum transmission unit specified by the communication method used in the network segment the virtual machine belongs to. With this process, even if a migration of a virtual machine takes place, it becomes possible to transmit a packet based on an MTU for the virtual machine appropriate to the virtual machine.

Furthermore, the notification method may include processes, (G) when a certain virtual machine moving out from the local physical machine causes a change in the communication method used in the network segment the certain virtual machine belongs to, to identify a virtual machine that belongs to the network segment, is running on the local physical machine, and is different from the certain virtual machine and (H) to notify the identified virtual machine of a data amount based on the maximum transmission unit specified by the communication method after the change. With these processes, even if a migration takes place as illustrated above, the notification may be coped with appropriately.

A program to perform the processing described above on a computer may be made. The program is stored in a computer-readable storage medium or storage apparatus such as a flexible disk, optical disk such as a CD-ROM, magneto-optical disk, semiconductor memory (for example, ROM), and hard disk. Data on the way of processing is stored temporarily on a storage apparatus such as RAM.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus, comprising:
a memory; and
a processor coupled to the memory and configured to:
detect change of a size of an acceptable transmission unit in a network segment as a result of a first packet transmitted from a first virtual machine via the network segment;
identify a second virtual machine configured to communicate via the network segment by determining whether the first virtual machine causing the changed size to be detected has a destination endpoint found in a record representing the second virtual machine; and
provide the second virtual machine with a notification of the changed size, where the notification includes a packet length computed as a maximum size of transmission other than a length of a header of the first packet according to the changed size so that the second virtual machine transmits a second packet based on the maximum size of transmission.

2. The apparatus of claim 1, wherein,
the change detected by the processor indicates the acceptable transmission unit changes to a smaller acceptable transmission unit, and
the processor is configured to cause the second virtual machine to transmit the second packet having a size that is within the smaller acceptable transmission unit.

3. The apparatus of claim 1, wherein,
the network segment includes a layer 3 network, and
the processor is configured to cause the second virtual machine to transmit the second packet based on a layer 2 communication over the layer 3 network.

4. The apparatus of claim 3, wherein,
the layer 3 network is an Internet protocol network, and
the layer 2 communication is a communication in a local area network.

5. The apparatus of claim 3, wherein,
the processor is further configured to determine the second virtual machine is configured to communicate via the network segment when the first virtual machine and the second virtual machine are associated with a same destination address in the layer 2 communication over the layer 3 network.

6. The apparatus of claim 5, wherein,
the memory is configured to store a first association between a first identifier identifying the first virtual machine and a first acceptable transmission unit, and a second association between a second identifier identifying the second virtual machine and the first acceptable transmission unit, and
the processor is further configured to:
detect that the acceptable transmission unit is changed from the first acceptable communication unit to a second acceptable communication unit based on the change detected due to the transmission of the first packet;
associate the first identifier with the second acceptable transmission unit in place of the first acceptable transmission unit based on the change; and
associate the second identifier with the second acceptable transmission unit in place of the first acceptable transmission unit when the first identifier is associated with the second acceptable transmission unit.

7. The apparatus of claim 6, wherein,
the acceptable transmission unit defines an acceptable transmission size of one datagram transmitted via the network segment, and
a second acceptable transmission size complying with the second acceptable transmission unit is smaller than a first acceptable transmission size complying with the first acceptable transmission unit.

8. The apparatus of claim 7, wherein,
the acceptable transmission size is an acceptable maximum size of the one datagram packet transmitted via the network segment.

9. The apparatus of claim 8, wherein,
the network segment in the layer 3 network included a plurality of paths complying with a layer 3 protocol, and
the acceptable maximum size of the one datagram is defined based on a path accepting a minimum acceptable size among the plurality of paths.

10. The apparatus of claim 6, wherein,
the processor is configured to store the second association in the memory when the second virtual machine is migrated from another apparatus to the apparatus or is newly activated in the apparatus.

11. The apparatus of claim 6, wherein,
the processor is configured to delete the second association from the memory when the second virtual machine is deactivated.

12. The apparatus of claim 1, wherein
the processor is further configured to receive a notification to notifying the acceptable transmission unit, and
the processor is configured to detect the change based on the notification.

13. The apparatus of claim 1, wherein
the processor is configured to determine that a size of the first packet transmitted by the first virtual machine exceeds the acceptable transmission unit due to the change, by comparing a notification indicating an acceptable transmission unit with the size of the first packet.

14. The apparatus of claim 2, wherein,
the processor is further configured to determine the second virtual machine is configured to communicate via the network segment when the first virtual machine and the second virtual machine are associated with a same destination address.

15. The apparatus of claim 1, wherein,
the processor is configured to transmit a packet having a size supposed to exceed the acceptable transmission unit to specify the acceptable transmission unit.

16. The apparatus of claim 1, wherein
the apparatus is a single server.

17. The apparatus of claim 1, wherein
the memory is configured to store a program, the program causing the processor to detect the change of the acceptable transmission unit in the network.

18. A method, comprising:
detecting change of a size of an acceptable transmission unit in a network segment as a result of a first packet transmitted from a first virtual machine via the network segment;
identifying a second virtual machine configured to communicate via the network segment by determining whether the first virtual machine causing the changed size to be detected has a destination endpoint found in a record representing the second virtual machine; and
providing the second virtual machine with a notification of the changed size, where the notification includes a packet length computed as a maximum size of transmission other than a length of a header of the first packet according to the changed size so that the second virtual machine transmits a second packet based on the maximum size of transmission.

19. A non-transitory computer-readable medium including a program, which when executed by a computer, causes the computer to:
detect change of a size of an acceptable transmission unit in a network segment as a result of a first packet transmitted from a first virtual machine via the network segment;
identify a second virtual machine configured to communicate via the network segment by determining whether the first virtual machine causing the changed size to be detected has a destination endpoint found in a record representing the second virtual machine; and
provide the second virtual machine with a notification of the changed size, where the notification includes a packet length computed as a maximum size of transmission other than a length of a header of the first packet according to the changed size so that the second virtual machine transmits a second packet based on the maximum size of transmission.

* * * * *